(12) United States Patent
Stryker et al.

(10) Patent No.: US 12,287,402 B2
(45) Date of Patent: Apr. 29, 2025

(54) SONAR PING SYNCHRONIZATION AND ASSOCIATED METHODS

(71) Applicant: NAVICO, INC., Tulsa, OK (US)

(72) Inventors: Adam C. Stryker, Broken Arrow, OK (US); Ryan W. McCarter, Broken Arrow, OK (US)

(73) Assignee: Navico, Inc., Tulsa, OK (US)

( * ) Notice: Subject to any disclaimer, the term of this patent is extended or adjusted under 35 U.S.C. 154(b) by 383 days.

(21) Appl. No.: 17/837,262

(22) Filed: Jun. 10, 2022

(65) Prior Publication Data

US 2023/0400570 A1  Dec. 14, 2023

(51) Int. Cl.
 G01S 7/521 (2006.01)
 G01S 15/89 (2006.01)
 G01S 15/93 (2020.01)

(52) U.S. Cl.
 CPC .............. G01S 15/89 (2013.01); G01S 7/521 (2013.01); G01S 15/93 (2013.01)

(58) Field of Classification Search
 CPC .......... G01S 15/89; G01S 7/521; G01S 15/93
 See application file for complete search history.

(56) References Cited

U.S. PATENT DOCUMENTS

| | | |
|---|---|---|
| 5,311,095 A | 5/1994 | Smith et al. |
| 5,329,496 A | 7/1994 | Smith |
| 5,548,564 A | 8/1996 | Smith |

(Continued)

FOREIGN PATENT DOCUMENTS

| | | |
|---|---|---|
| AU | 2004258175 B2 | 1/2005 |
| AU | 2005309977 B2 | 6/2006 |

(Continued)

OTHER PUBLICATIONS

"Open Access Review: a Review of Acoustic Impedance Matching Techniques for Piezoelectric Sensors and Transducers;" Sensors; vol. 20; No. 14; Jul. 21, 2020; DOI: https://doi.org/10.3390/s20144051.

(Continued)

*Primary Examiner* — Isam A Alsomiri
*Assistant Examiner* — Abdallah Abulaban
(74) *Attorney, Agent, or Firm* — Nelson Mullins Riley & Scarborough LLP

(57) ABSTRACT

A synchronization wire for synchronizing sonar ping transmissions from sonar transducer elements or arrays is provided. The synchronization wire includes first and second connection points. The first connection point is configured to connect the synchronization wire to a first sonar module that is configured to control transmission of a first sonar ping from a first sonar transducer. The second connection point is configured to connect the synchronization wire to a second sonar module that is configured to control transmission of a second sonar ping from a second sonar transducer. The synchronization wire is configured to transfer an electrical current between the first and second sonar modules. The synchronization wire is configured to enable synchronization of the first and second sonar modules through the use of the electrical current. Processing circuitry in sonar modules may cause or prevent transmission of sonar pings based on the voltage level on the synchronization wire.

17 Claims, 18 Drawing Sheets

(56) References Cited

U.S. PATENT DOCUMENTS

| | | | |
|---|---|---|---|
| 5,744,898 A | 4/1998 | Smith et al. | |
| 6,084,827 A * | 7/2000 | Johnson | G01S 15/66 |
| | | | 367/103 |
| 6,678,210 B2 | 1/2004 | Rowe | |
| 6,763,303 B2 | 7/2004 | Chakraborty et al. | |
| 6,836,707 B2 | 12/2004 | Sowada et al. | |
| 7,046,582 B1 | 5/2006 | Kosalos et al. | |
| 7,133,326 B2 | 11/2006 | Kerfoot et al. | |
| 7,242,638 B2 | 7/2007 | Kerfoot et al. | |
| 7,369,458 B2 | 5/2008 | Sifferman et al. | |
| 7,457,196 B2 | 11/2008 | Acker et al. | |
| 7,512,037 B2 | 3/2009 | Frodyma et al. | |
| 7,542,376 B1 | 6/2009 | Thompson et al. | |
| 7,679,995 B2 | 3/2010 | Acker et al. | |
| 7,833,158 B2 | 11/2010 | Bartz | |
| 7,889,600 B2 | 2/2011 | Thompson et al. | |
| 8,009,512 B2 | 8/2011 | Acker et al. | |
| 8,179,741 B2 | 5/2012 | Bornsen | |
| 8,625,391 B2 | 1/2014 | Acker et al. | |
| 8,717,847 B2 | 5/2014 | Blake | |
| 8,811,120 B2 | 8/2014 | Bachelor et al. | |
| 8,817,575 B1 | 8/2014 | Benjamin | |
| RE45,379 E | 2/2015 | Rowe | |
| 8,964,506 B2 | 2/2015 | Acker et al. | |
| 8,964,507 B2 | 2/2015 | Bachelor et al. | |
| 9,091,790 B2 | 7/2015 | Caute et al. | |
| 9,218,799 B2 | 12/2015 | Stytsenko et al. | |
| 9,322,915 B2 | 4/2016 | Betts et al. | |
| 9,386,964 B2 | 7/2016 | Bagge | |
| 9,658,331 B2 | 5/2017 | Ramamurthy et al. | |
| 9,772,416 B2 | 9/2017 | Caute et al. | |
| 9,772,417 B2 | 9/2017 | Caute et al. | |
| 9,784,825 B2 * | 10/2017 | Brown | G01S 7/52003 |
| 9,784,826 B2 | 10/2017 | Matson et al. | |
| 9,812,118 B2 | 11/2017 | Matson et al. | |
| 9,947,309 B2 | 4/2018 | Stokes et al. | |
| 10,107,908 B2 | 10/2018 | Betts et al. | |
| 10,215,849 B2 | 2/2019 | Kozuki | |
| 10,241,200 B2 | 3/2019 | Sayer et al. | |
| 10,310,062 B2 | 6/2019 | Coleman et al. | |
| 10,338,195 B2 | 7/2019 | Stokes et al. | |
| 10,365,356 B2 | 7/2019 | Stokes et al. | |
| 10,408,933 B1 | 9/2019 | DeHart et al. | |
| 10,451,758 B2 | 10/2019 | Caute et al. | |
| 10,502,820 B2 | 12/2019 | Zimmerman et al. | |
| 10,545,226 B2 | 1/2020 | Wigh et al. | |
| 10,605,913 B2 | 3/2020 | Coleman et al. | |
| 10,852,429 B2 | 12/2020 | Gatland | |
| 10,890,660 B2 | 1/2021 | Wigh et al. | |
| 10,914,810 B2 | 2/2021 | Laster et al. | |
| 10,952,706 B2 | 3/2021 | Freeman | |
| 11,059,556 B2 | 7/2021 | Ahlgren | |
| 11,125,866 B2 | 9/2021 | Sumi et al. | |
| 2014/0092709 A1 | 4/2014 | Miller et al. | |
| 2017/0031022 A1 | 2/2017 | Ivanov | |
| 2017/0031023 A1 | 2/2017 | Ivanov | |
| 2017/0285134 A1* | 10/2017 | Stokes | G01S 15/86 |
| 2018/0224544 A1 | 8/2018 | Ivanov | |
| 2018/0317888 A1 | 11/2018 | Freeman | |
| 2020/0011965 A1 | 1/2020 | Stokes et al. | |
| 2020/0011981 A1 | 1/2020 | Stokes et al. | |
| 2020/0011991 A1 | 1/2020 | Stokes et al. | |
| 2020/0072953 A1 | 3/2020 | Wigh et al. | |
| 2020/0088840 A1 | 3/2020 | Stokes et al. | |
| 2020/0116843 A1 | 4/2020 | Zimmerman et al. | |
| 2020/0158842 A1 | 5/2020 | Wigh et al. | |
| 2020/0256967 A1 | 8/2020 | Wigh et al. | |
| 2020/0300994 A1 | 9/2020 | Matson et al. | |
| 2021/0096244 A1 | 4/2021 | Wigh et al. | |
| 2021/0141048 A1 | 5/2021 | Laster et al. | |
| 2021/0165068 A1 | 6/2021 | Clark | |
| 2021/0173061 A1 | 6/2021 | Fyler et al. | |
| 2021/0263150 A1 | 8/2021 | Stokes | |
| 2021/0364636 A1 | 11/2021 | Simonton | |
| 2021/0389439 A1 | 12/2021 | Sumi et al. | |
| 2022/0113393 A1 | 4/2022 | Nishimori et al. | |
| 2022/0120882 A1 | 4/2022 | Coleman et al. | |

FOREIGN PATENT DOCUMENTS

| | | |
|---|---|---|
| AU | 2006297752 B2 | 4/2007 |
| AU | 2010257338 B2 | 5/2012 |
| AU | 2009283312 B8 | 6/2015 |
| AU | 2019203322 B2 | 12/2020 |
| CA | 2733895 A1 | 2/2010 |
| CA | 2530290 C | 11/2015 |
| CA | 2899119 A1 | 1/2017 |
| CA | 2928461 A1 | 1/2017 |
| CA | 2993361 A1 | 2/2017 |
| CA | 3042656 A1 | 11/2019 |
| CN | 105759257 A | 7/2016 |
| CN | 110493698 A | 11/2019 |
| EP | 1825296 B1 | 4/2009 |
| EP | 1887383 B1 | 11/2009 |
| EP | 2318860 A1 | 5/2011 |
| EP | 1941298 B1 | 2/2012 |
| EP | 2612165 A1 | 7/2013 |
| EP | 3170020 A1 | 5/2017 |
| EP | 3325997 A1 | 5/2018 |
| EP | 3572837 A1 | 11/2019 |
| EP | 2326970 B1 | 10/2020 |
| EP | 3380863 B1 | 9/2021 |
| EP | 2956796 B1 | 4/2022 |
| EP | 4009069 A1 | 6/2022 |
| JP | 2004-080577 A | 3/2004 |
| JP | 2007-535195 A | 11/2007 |
| JP | 5600678 B2 | 10/2014 |
| JP | 5688197 B2 | 3/2015 |
| JP | 2017-227489 A | 12/2017 |
| JP | 6444319 B2 | 12/2018 |
| JP | 2019-030623 A | 2/2019 |
| JP | 2020-039841 A | 3/2020 |
| JP | 6732274 B1 | 7/2020 |
| JP | 6737464 B2 | 8/2020 |
| JP | 2020-141250 A | 9/2020 |
| JP | 2020-155900 A | 9/2020 |
| KR | 200184719 Y1 | 6/2000 |
| WO | WO 94/09605 A1 | 4/1994 |
| WO | WO 2005/008272 A2 | 1/2005 |
| WO | WO 2012/028896 A2 | 3/2012 |
| WO | WO 2013/126761 A1 | 8/2013 |
| WO | WO 2014/126847 A2 | 8/2014 |
| WO | WO 2017/015741 A1 | 2/2017 |
| WO | WO 2018/222556 A1 | 12/2018 |
| WO | WO 2020/171866 A2 | 8/2020 |
| WO | WO 2020/174640 A1 | 9/2020 |
| WO | WO 2021/019858 A1 | 2/2021 |
| WO | WO 2021/127592 A2 | 6/2021 |
| WO | WO 2021/176726 A1 | 9/2021 |
| WO | WO 2021/220377 A1 | 11/2021 |

OTHER PUBLICATIONS

"S5100 Sounder with CHIRP;" *SIMRAD*; retrieved Sep. 22, 2022 from https://www.simrad-yachting.com/simrad/series/s5100-sounder-with-chirp/s5100-sonar-module/?gclid=EAIaIQobChMI7qS9g9GZ-gIVhovIChlmtwEJEAQYASABEgJvB_D_BwE.

* cited by examiner

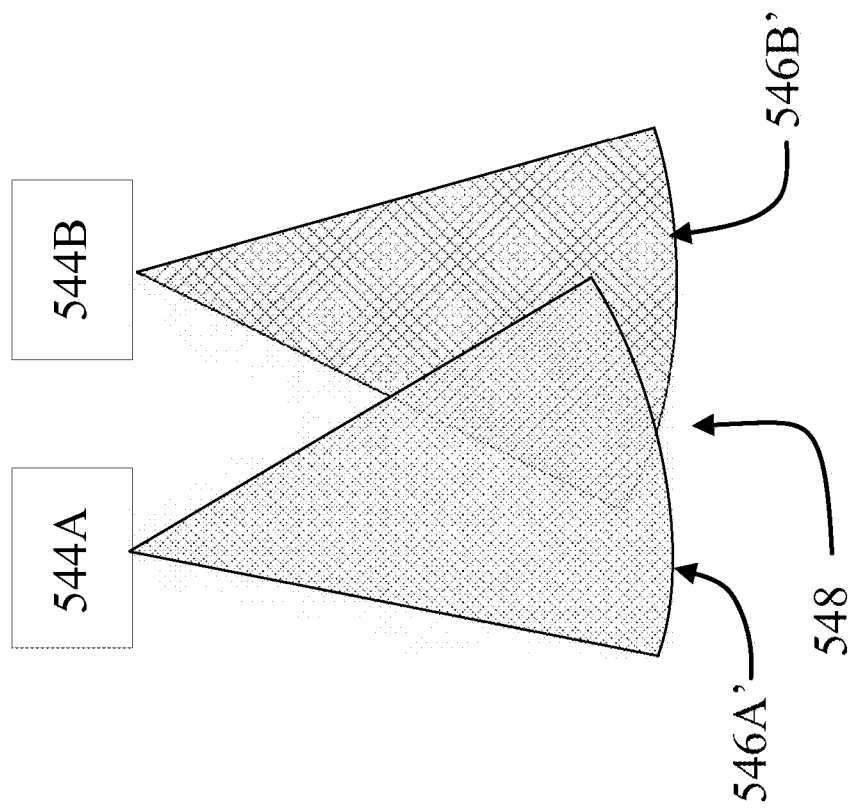

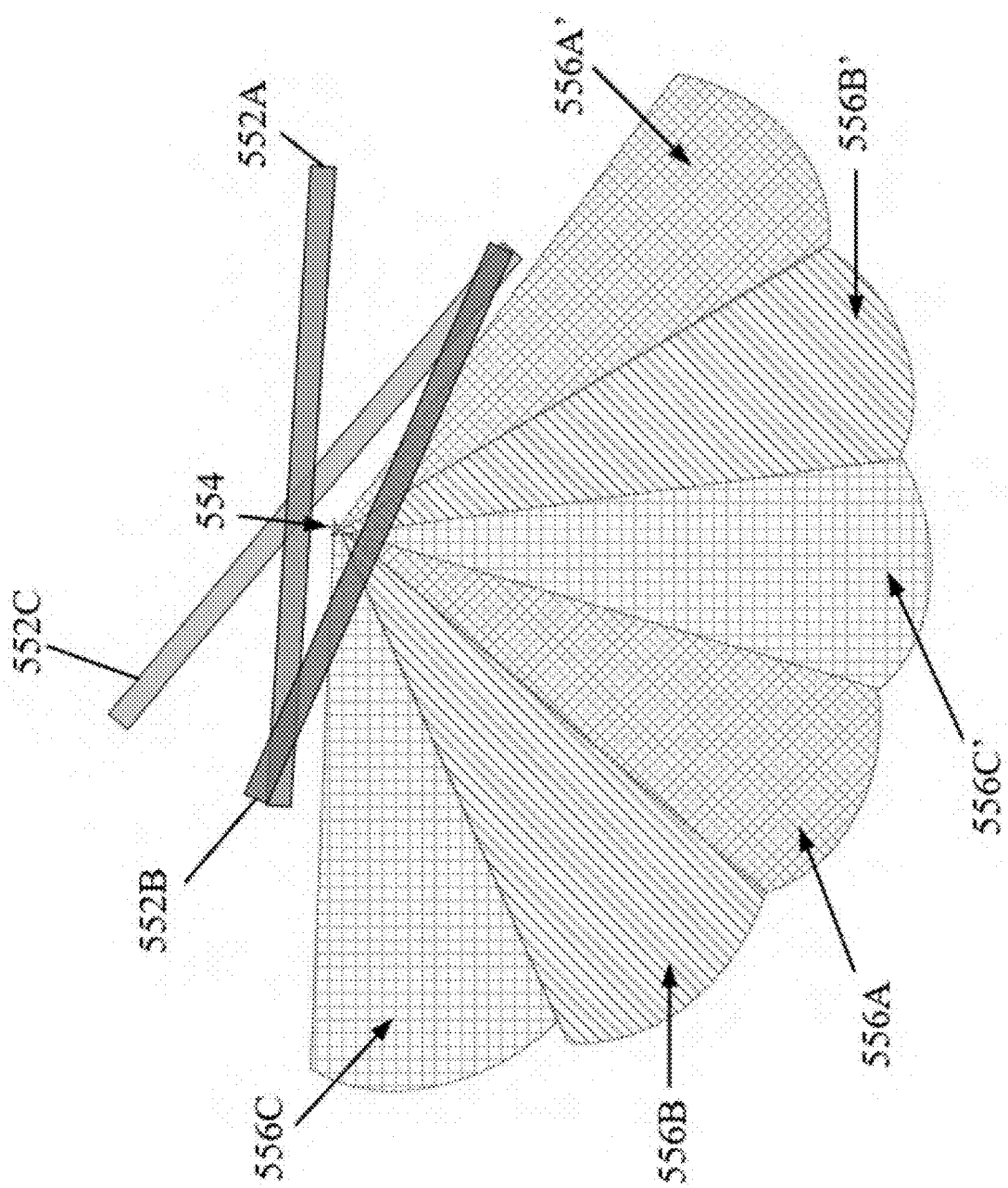

SONAR PING SYNCHRONIZATION AND ASSOCIATED METHODS

FIELD OF THE INVENTION

Embodiments of the present invention relate generally to sonar systems for a watercraft and, more particularly, to systems and associated methods for synchronizing sonar pings from multiple sonar transducer elements.

BACKGROUND OF THE INVENTION

Sonar systems have been used to generate sonar pings into an underwater environment. However, many of these sonar systems only transmit sonar pings from one sonar transducer at a time. Attempts to transmit sonar pings using multiple sonar transducers simultaneously often creates issues with ping interference between transmitted sonar pings. This often restricts the ability to use multiple sonar transducers simultaneously.

BRIEF SUMMARY OF THE INVENTION

In various embodiments, sonar pings may be transmitted from multiple separate sonar units simultaneously, and this may be done with reduced ping interference. Sonar pings may be provided in a synchronized fashion, and this may greatly reduce ping interference between sonar pings of different sonar units. By allowing for sonar pings to be transmitted with reduced ping interference, in some embodiments, sonar pings from separate sonar units may work together to create combined pings having more sonar information. For example, combined pings may provide a greater image quality for generated sonar images and/or a wider beam angle for sonar coverage.

A synchronization wire may be provided that may be connected to multiple sonar modules. The synchronization wire may assist in achieving synchronization in the sonar modules so that the sonar modules may cause sonar pings to be generated in a synchronized manner. Processing circuitry within each of the sonar modules may cause electrical current having a voltage to be output to the synchronization wire from the sonar module, with the output voltage level being dependent on whether or not the respective sonar module is ready to cause transmission of a sonar ping. The processing circuitry within each of the sonar modules may also receive and detect a synchronization voltage value from the synchronization wire. If the synchronization voltage value meets certain criteria (e.g. the synchronization voltage value is above a specified value), the processing circuitry in the various sonar modules may cause transmission of the sonar pings at the same time. However, if the synchronization voltage value does not meet the criteria (e.g. the synchronization voltage value is not above a specified value), the processing circuitry in the various sonar modules may prevent transmission of the sonar pings.

Various embodiments provided herein possess several potential advantages. First, embodiments enable transmission of sonar pings at the same time, providing a greater image quality for sonar images and/or a wider beam angle. By transmitting sonar pings in a synchronized fashion, the amount of ping interference is greatly reduced. Second, many embodiments have improved scalability. Processing circuitry may be provided in sonar modules, and the synchronization wire may be provided without its own independent processing circuitry. Thus, a large number of sonar modules may be added to the synchronization wire without requiring significant changes to the synchronization wire. Third, systems described herein may be easy to install, and additional sonar modules may be easily added to an existing system without significant changes.

In an example embodiment, a system for synchronizing sonar ping transmissions from multiple sonar transducer elements or arrays is provided. The system includes a first sonar module that is configured to control a first time of transmission of a first sonar ping from a first sonar transducer. The first sonar module has a first processing circuitry and a first memory including a first computer program code. The system also includes a second sonar module that is configured to control a second time of transmission of a second sonar ping from a second sonar transducer. The second sonar module has a second processing circuitry and a second memory including a second computer program code. The system also includes a synchronization wire connecting the first sonar module and the second sonar module. Furthermore, the first computer program code is configured to, when executed, cause the first processing circuitry to perform various tasks. These tasks include causing a first voltage level to be output to the synchronization wire when the first sonar module is ready to transmit the first sonar ping; causing a second voltage level to be output to the synchronization wire when the first sonar module is not ready to transmit the first sonar ping; receiving a synchronization voltage value from the synchronization wire; determining whether the synchronization voltage value meets predefined criteria; and sending a first signal to a first sonar transducer upon determining that the synchronization voltage value meets the predefined criteria. The first signal is configured to cause transmission of the first sonar ping. Additionally, the second computer program code is configured to, when executed, cause the second processing circuitry to perform various tasks. These various tasks include causing a third voltage level to be output to the synchronization wire when the second sonar module is ready to transmit the second sonar ping; causing a fourth voltage level to be output to the synchronization wire when the second sonar module is not ready to transmit the second sonar ping; receiving a synchronization voltage value from the synchronization wire; determining whether the synchronization voltage value meets the predefined criteria; and sending a second signal to a second sonar transducer upon determining that the synchronization voltage value meets the predefined criteria. The second signal is configured to cause transmission of the second sonar ping such that the transmission of the second sonar ping occurs at a same time as the transmission of the first sonar ping.

In some embodiments, the first sonar ping and the second sonar ping may provide continuous sonar beam coverage of an underwater environment. The first sonar ping may have a first beam angle, the second sonar ping may have a second beam angle, and the continuous sonar beam coverage may have an increased effective beam angle relative to each of the first beam angle and the second beam angle. In some embodiments, the first sonar ping and the second sonar ping may have overlapping coverage volumes to provide improved image quality.

In some embodiments, the first computer program code may be configured to, when executed, cause the first processing circuitry to determine whether the synchronization voltage value exceeds a specified value. Additionally, the first computer program code may be configured to, when executed, cause the first processing circuitry to cause transmission of the first sonar ping at a synchronized time upon determining that the synchronization voltage value exceeds the specified value.

In some embodiments, the first computer program code may be configured to, when executed, cause the first processing circuitry to determine whether the synchronization voltage value is equal to a specified value. Additionally, the first computer program code may be configured to, when executed, cause the first processing circuitry to cause transmission of the first sonar ping at a synchronized time upon determining that the synchronization voltage value is equal to the specified value.

In some embodiments, the first sonar module may also include a first control pin and a first sync circuit. The first computer program code may be configured to, when executed, cause the first processing circuitry to cause the first voltage level to be output to the synchronization wire when the first sonar module is ready to transmit the first sonar ping by causing the first control pin to contact a portion of the first sync circuit to close the first sync circuit. Additionally, the first computer program code may be configured to, when executed, cause the second voltage level to be output to the synchronization wire when the first sonar module is not ready to transmit the first sonar ping by causing the first control pin to avoid contact with the first sync circuit so that the first sync circuit remains open. In some related embodiments, the first sonar module may also include a first sense pin that is configured to transfer electrical current between the synchronization wire and the first processing circuitry. In some embodiments, the first sync circuit may include a voltage source, and causing the first control pin to avoid contact with the first sync circuit may cause electrical current to flow to ground. In some embodiments, the first sync circuit may operate through open drain topology. Additionally, in some related embodiments, the first sync circuit may include a pull-up resistor.

In some embodiments, the second sonar module may include a second control pin and a second sync circuit. The second computer program code may be configured to, when executed, cause the second processing circuitry to cause the third voltage level to be output to the synchronization wire when the second sonar module is ready to transmit the second sonar ping by causing the second control pin to contact a portion of the second sync circuit to close the second sync circuit. The second computer program code may also be configured to, when executed, cause the fourth voltage level to be output to the synchronization wire when the second sonar module is not ready to transmit the second sonar ping by causing the second control pin to avoid contact with the second sync circuit so that the second sync circuit remains open.

In some embodiments, the first voltage level may be a non-zero voltage, and the second voltage level may be zero. Additionally, in some embodiments, the system may include three or more sonar modules, and the synchronization wire may connect each of the three or more sonar modules.

In another example embodiment, a synchronization wire is provided for synchronizing sonar ping transmissions from multiple sonar transducer elements or arrays. The synchronization wire includes a first connection point and a second connection point. The first connection point is configured to connect the synchronization wire to a first sonar module that is configured to control transmission of a first sonar ping from a first sonar transducer. The second connection point is configured to connect the synchronization wire to a second sonar module that is configured to control transmission of a second sonar ping from a second sonar transducer. The synchronization wire is configured to transfer electrical current from the first sonar module to the second sonar module, and the synchronization wire is configured to transfer electrical current from the second sonar module to the first sonar module. The synchronization wire is also configured to enable synchronization of the first sonar module and the second sonar module through the use of the electrical current.

In some embodiments, the synchronization wire may include three or more connection points. Each of the three or more connection points may be configured to connect the synchronization wire to each of three or more sonar modules. The synchronization wire may be configured to transfer electrical current between the three or more sonar modules. The synchronization wire may be configured to enable synchronization of the three or more sonar modules through the use of the electrical current.

In another example embodiment, a method is provided for synchronizing sonar ping transmissions from multiple sonar transducer elements or arrays. The method includes determining whether the first sonar module is ready to transmit a first sonar ping; causing a first voltage level to be output to a synchronization wire when the first sonar module is ready to transmit a first sonar ping; causing a second voltage level to be output to the synchronization wire when the first sonar module is not ready to transmit the first sonar ping, with the synchronization wire being configured to receive electrical current from a second sonar module; receiving a synchronization voltage value from the synchronization wire; determining the synchronization voltage value; determining whether the synchronization voltage value meets predefined criteria; and sending a signal to a sonar transducer upon determining that the synchronization voltage value meets the predefined criteria. The second sonar module is configured to cause transmission of a second sonar ping. The signal is configured to cause transmission of the first sonar ping such that the transmission of the first sonar ping occurs at a same time as the transmission of the second sonar ping.

In some embodiments, the first sonar ping and the second sonar ping may provide continuous sonar beam coverage of an underwater environment. The first sonar ping may have a first beam angle, the second sonar ping may have a second beam angle, and the continuous sonar beam coverage may have an increased effective beam angle relative to each of the first beam angle and the second beam angle. In some embodiments, the first sonar ping and the second sonar ping may have overlapping coverage volumes to provide improved image quality. Additionally, in some embodiments, the signal may be configured to cause transmission of the first sonar ping such that the transmission of the first sonar ping occurs simultaneously with transmission of at least two other sonar pings.

Additional example embodiments of the present invention include methods, systems, and computer program products associated with various embodiments described herein.

BRIEF DESCRIPTION OF THE DRAWINGS

Figure 1:
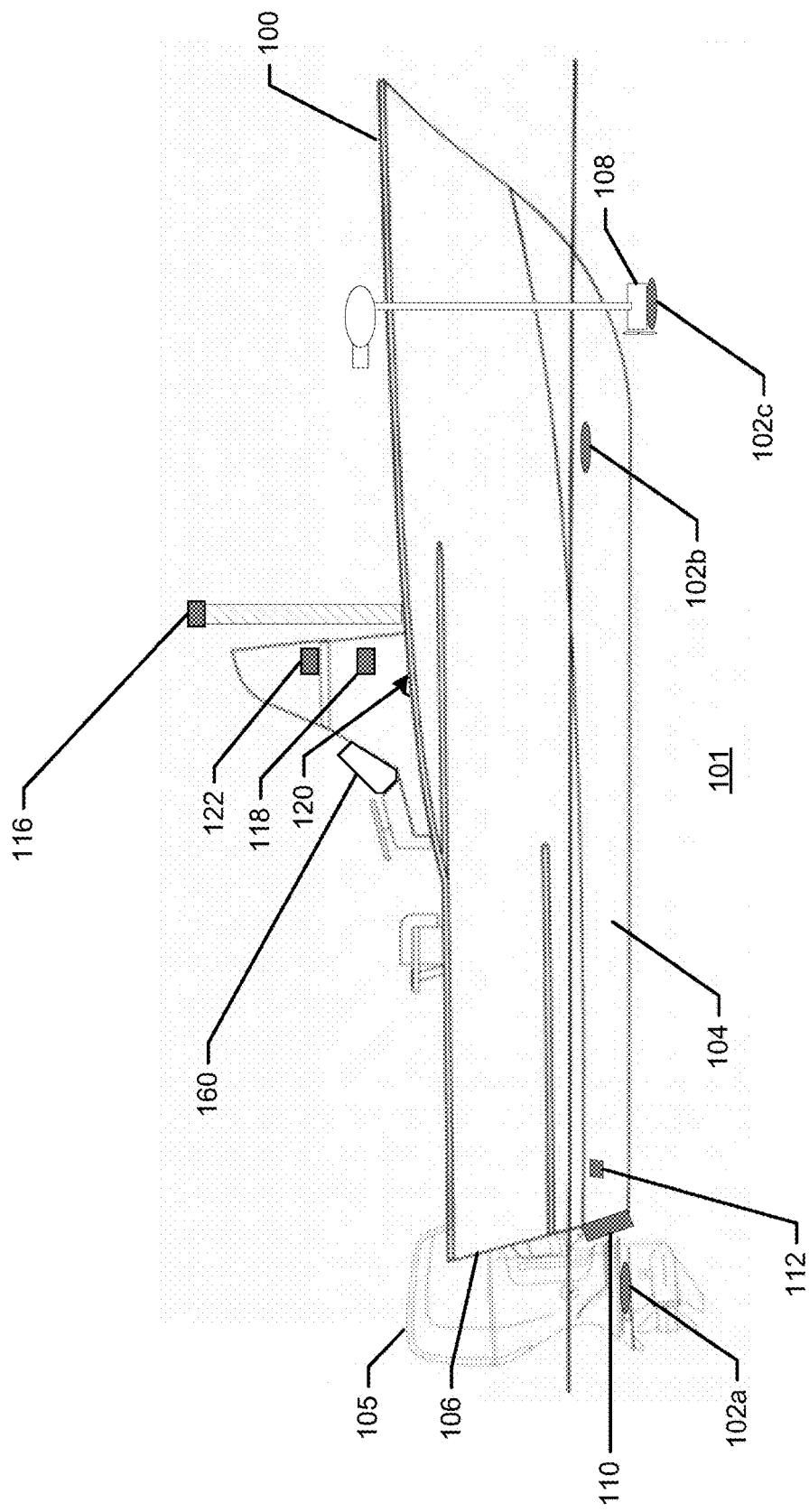
Figure 2A:
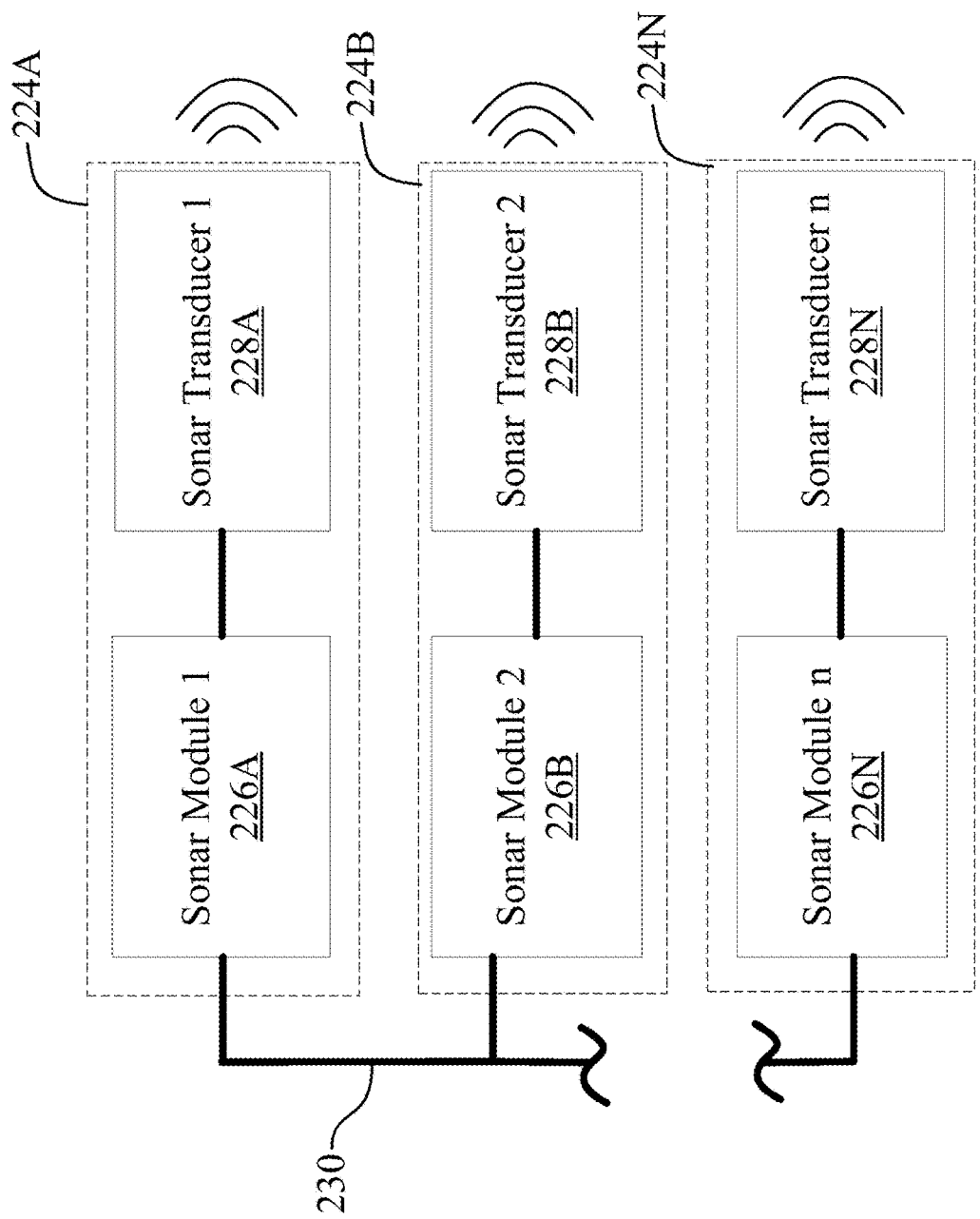
Figure 2B:
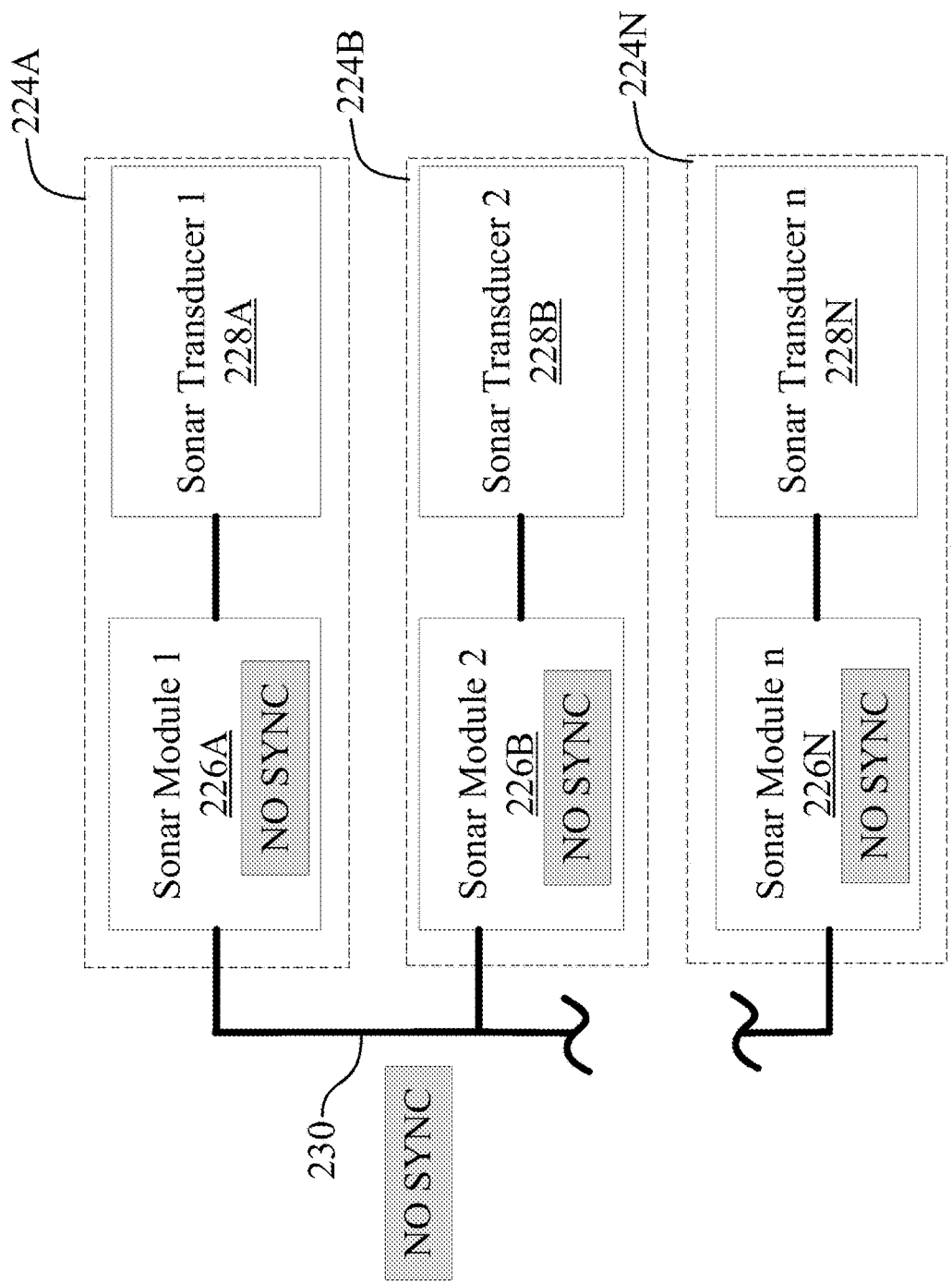
Figure 2C:
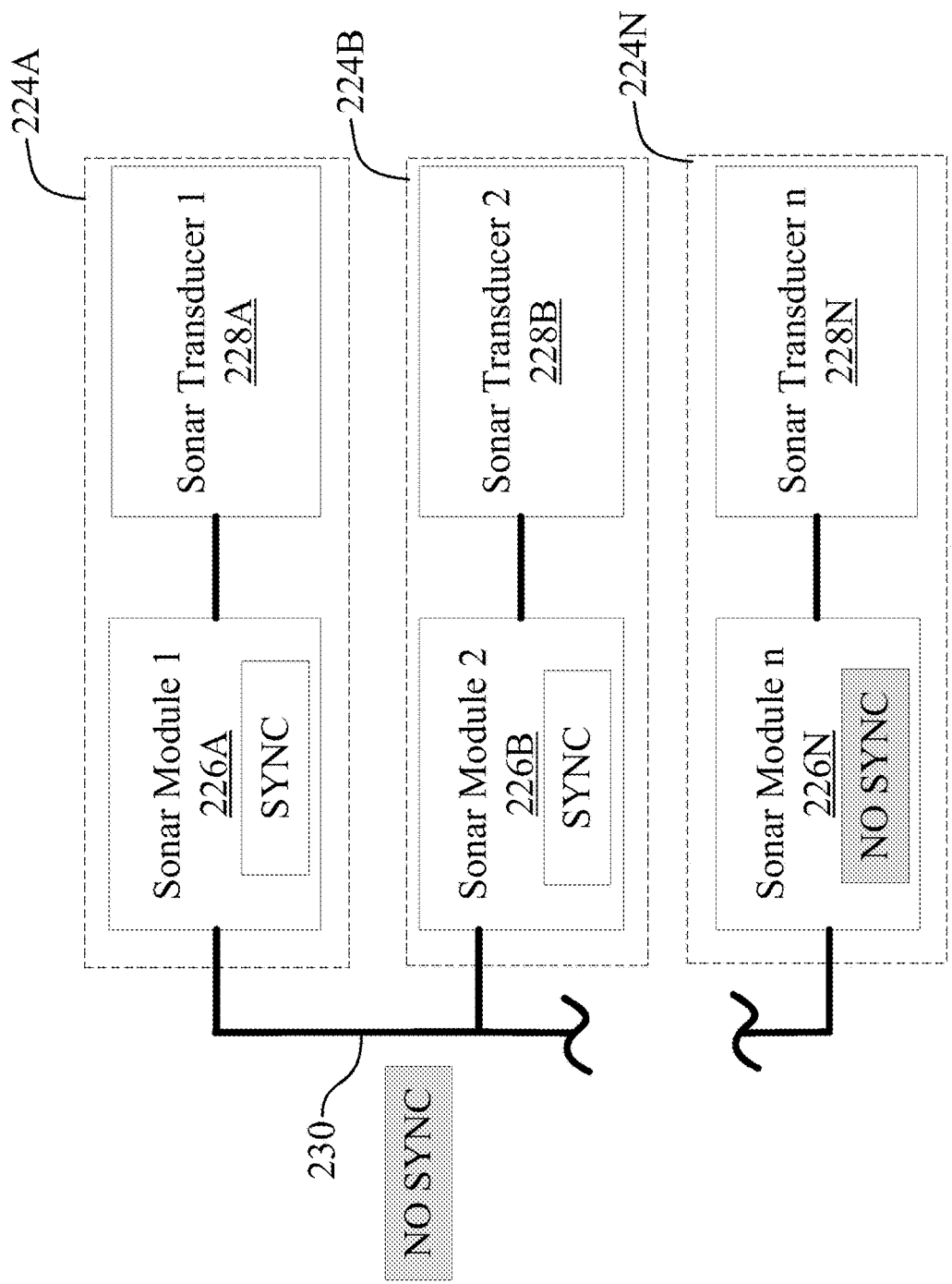
Figure 2D:
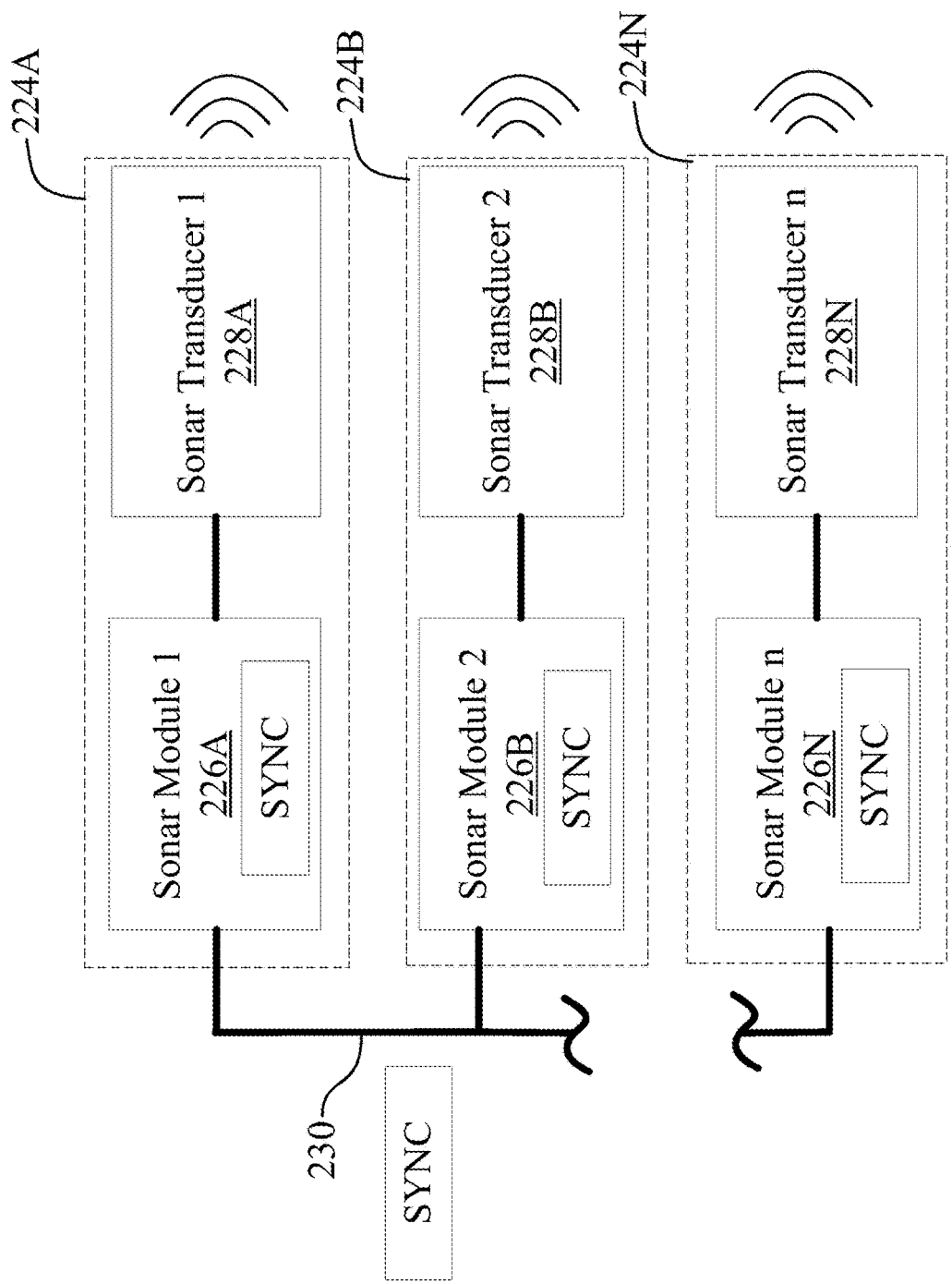
Figure 3A:
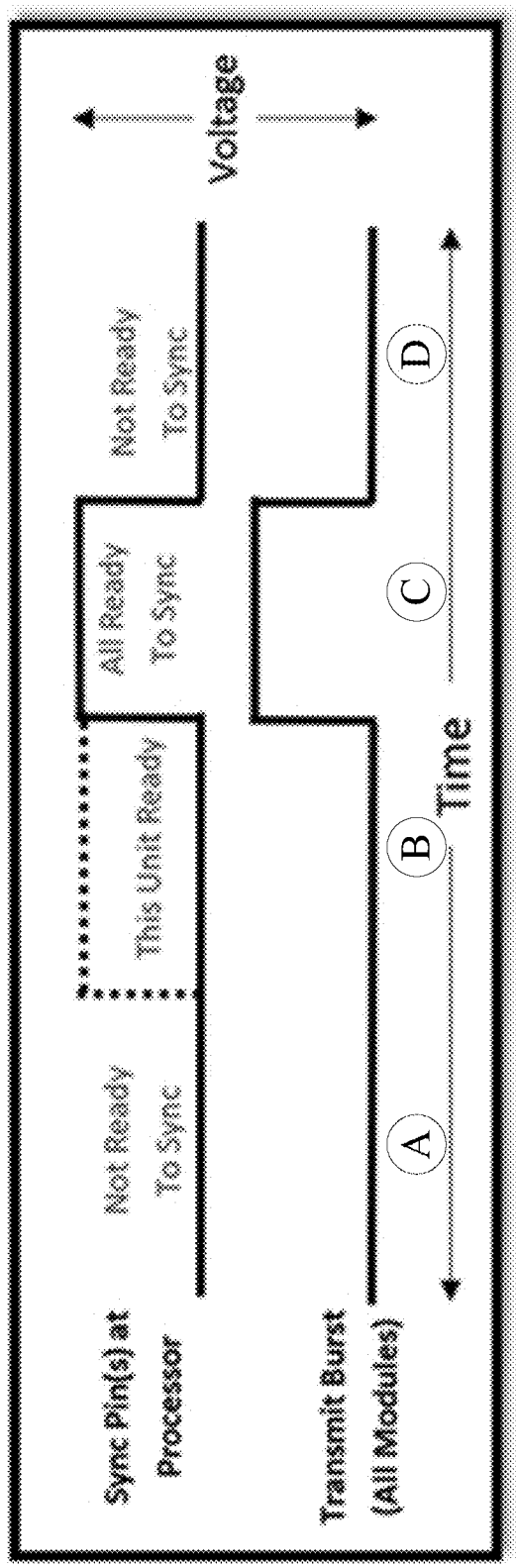
Figure 3B:
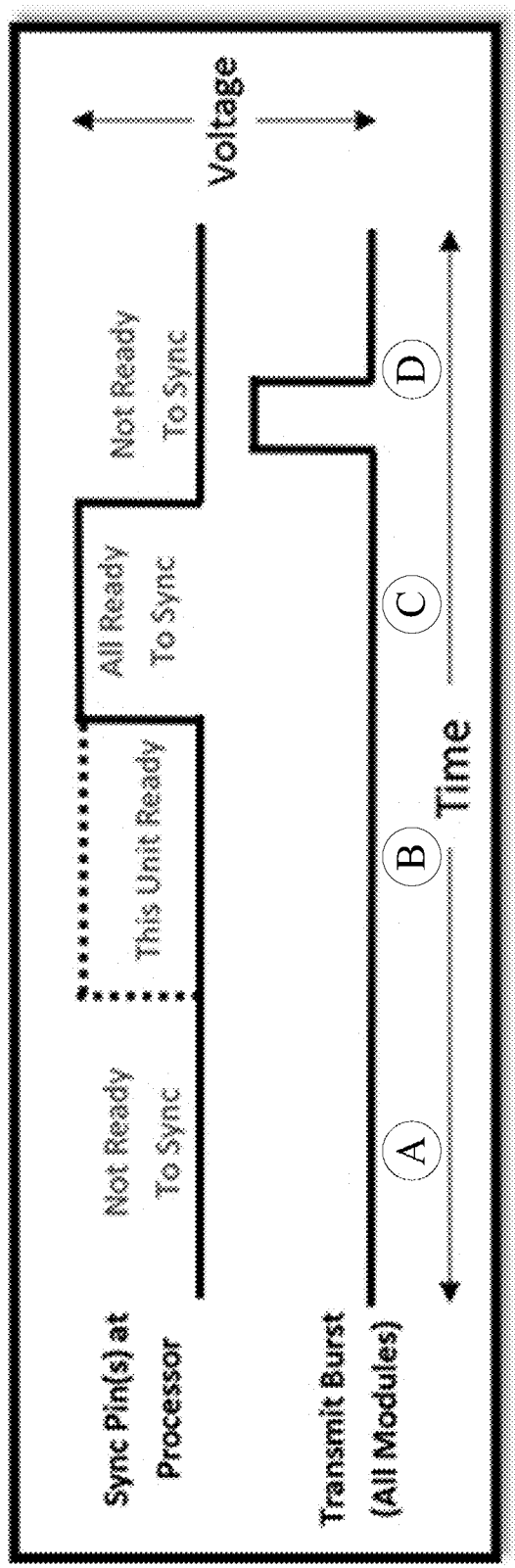
Figure 4A:
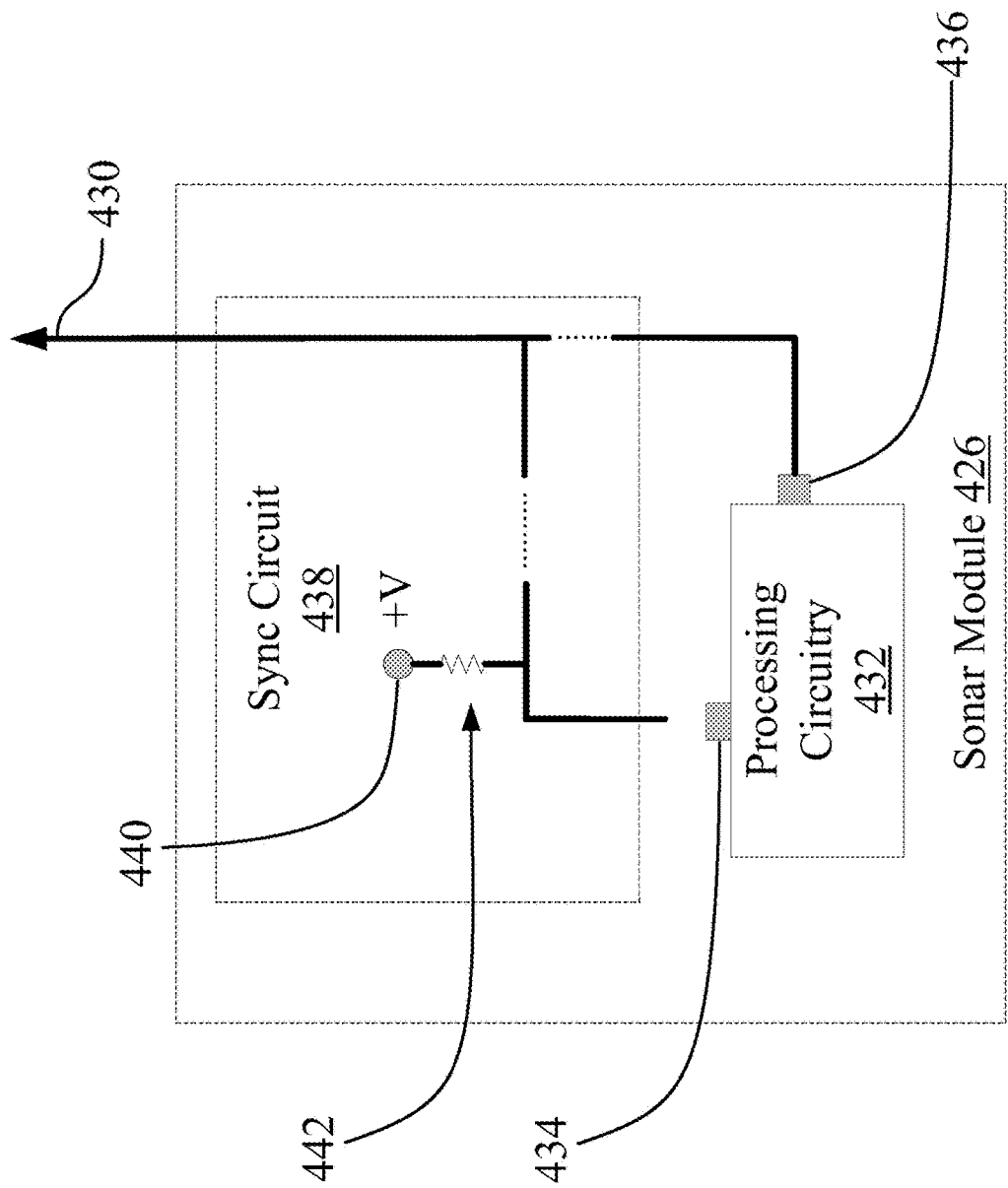
Figure 4B:
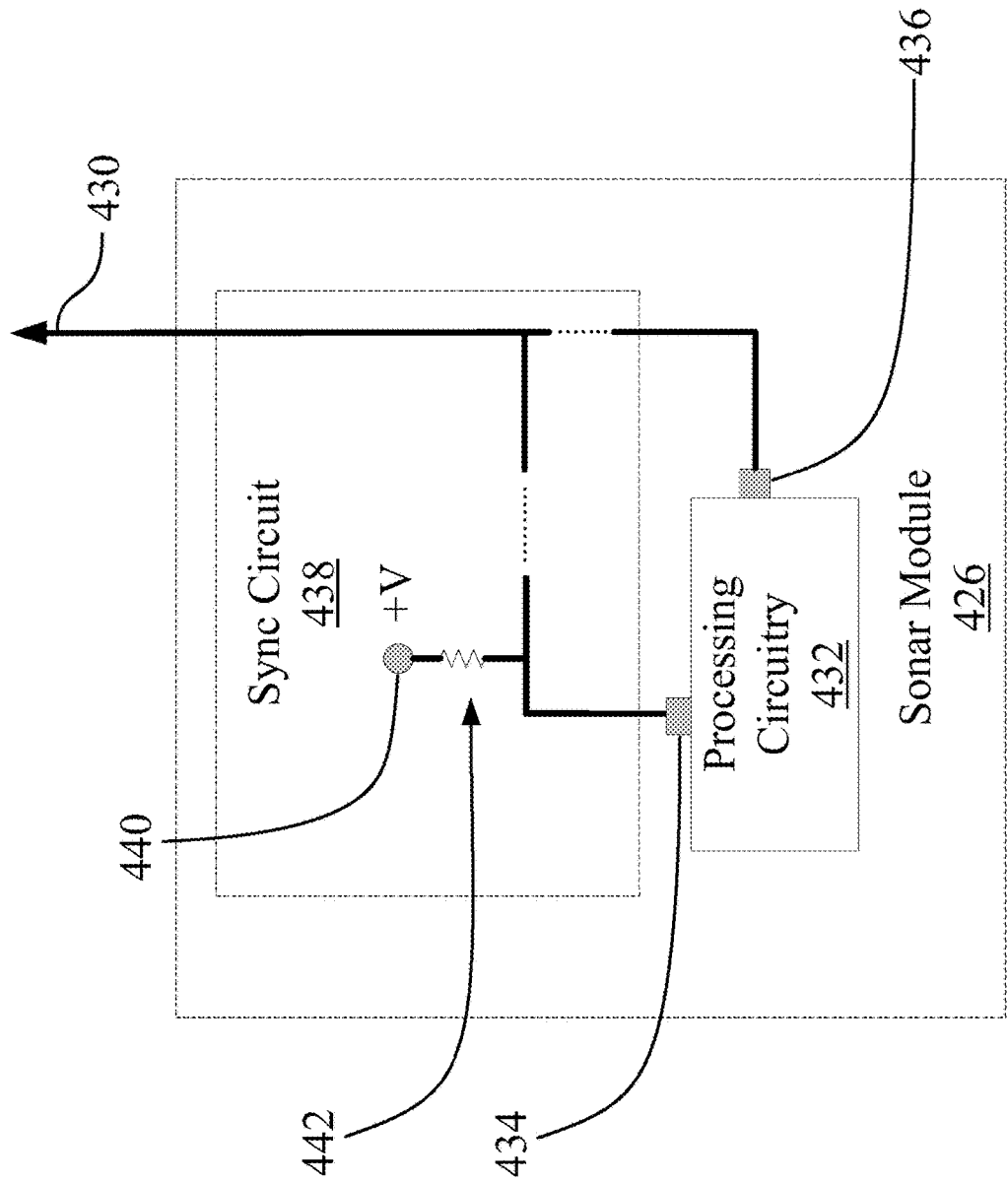
Figure 5A:
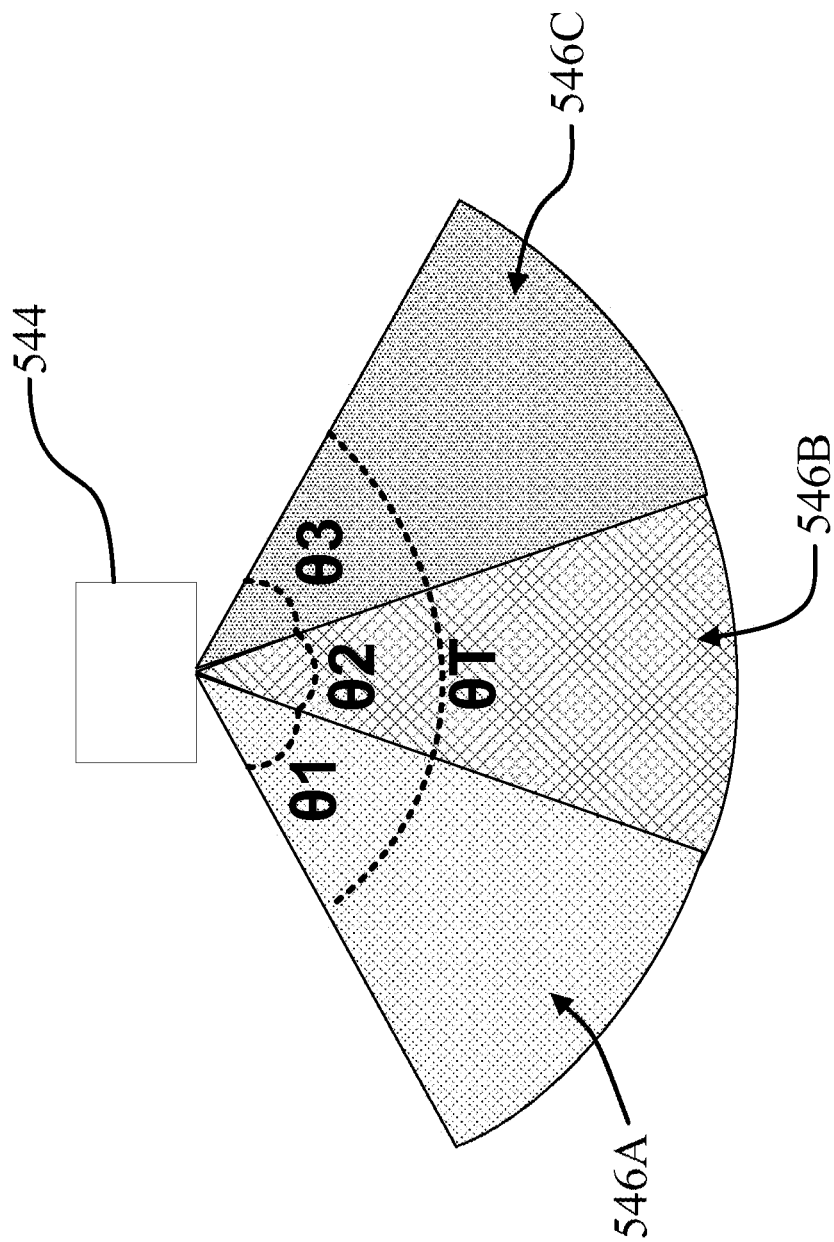
Figure 5D:
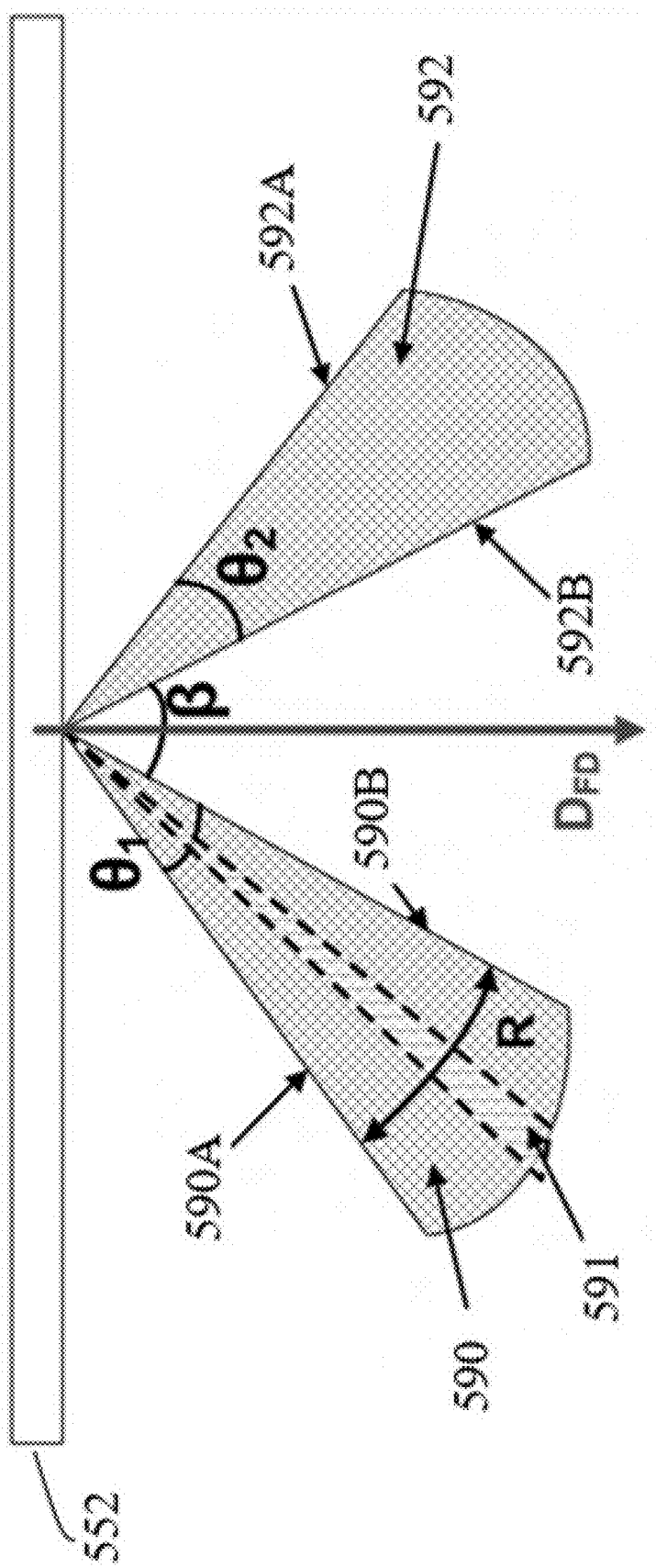
Figure 6A:
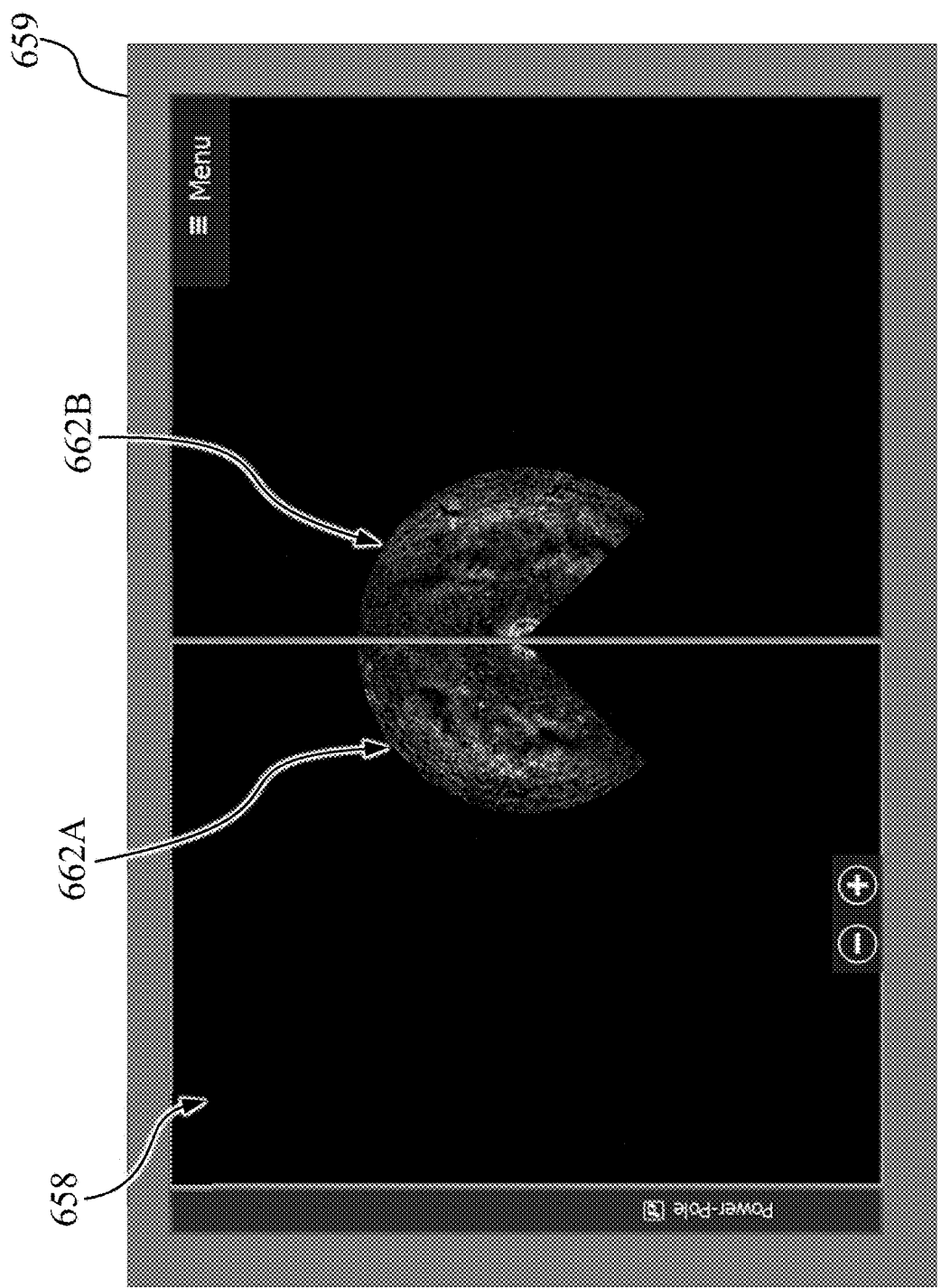
Figure 6B:
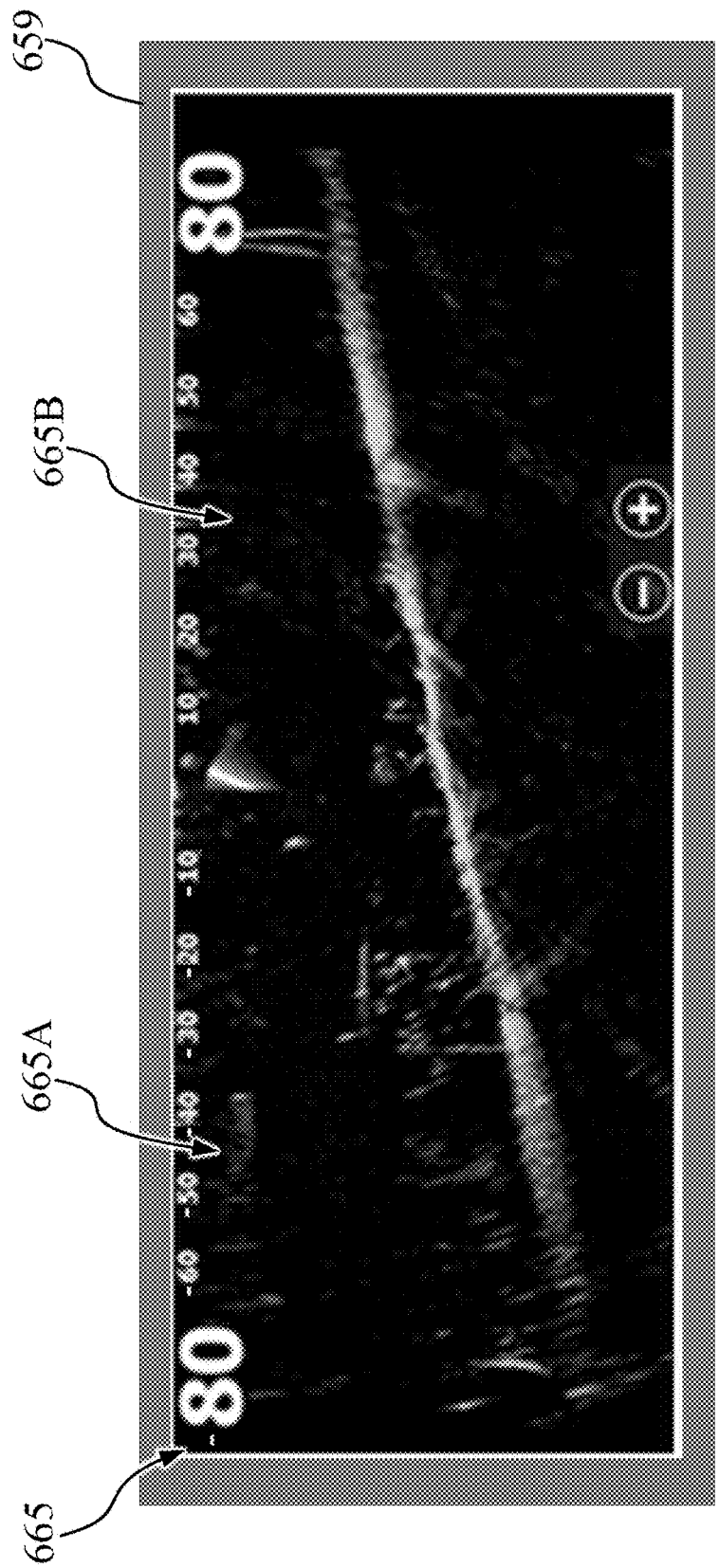
Figure 6C:
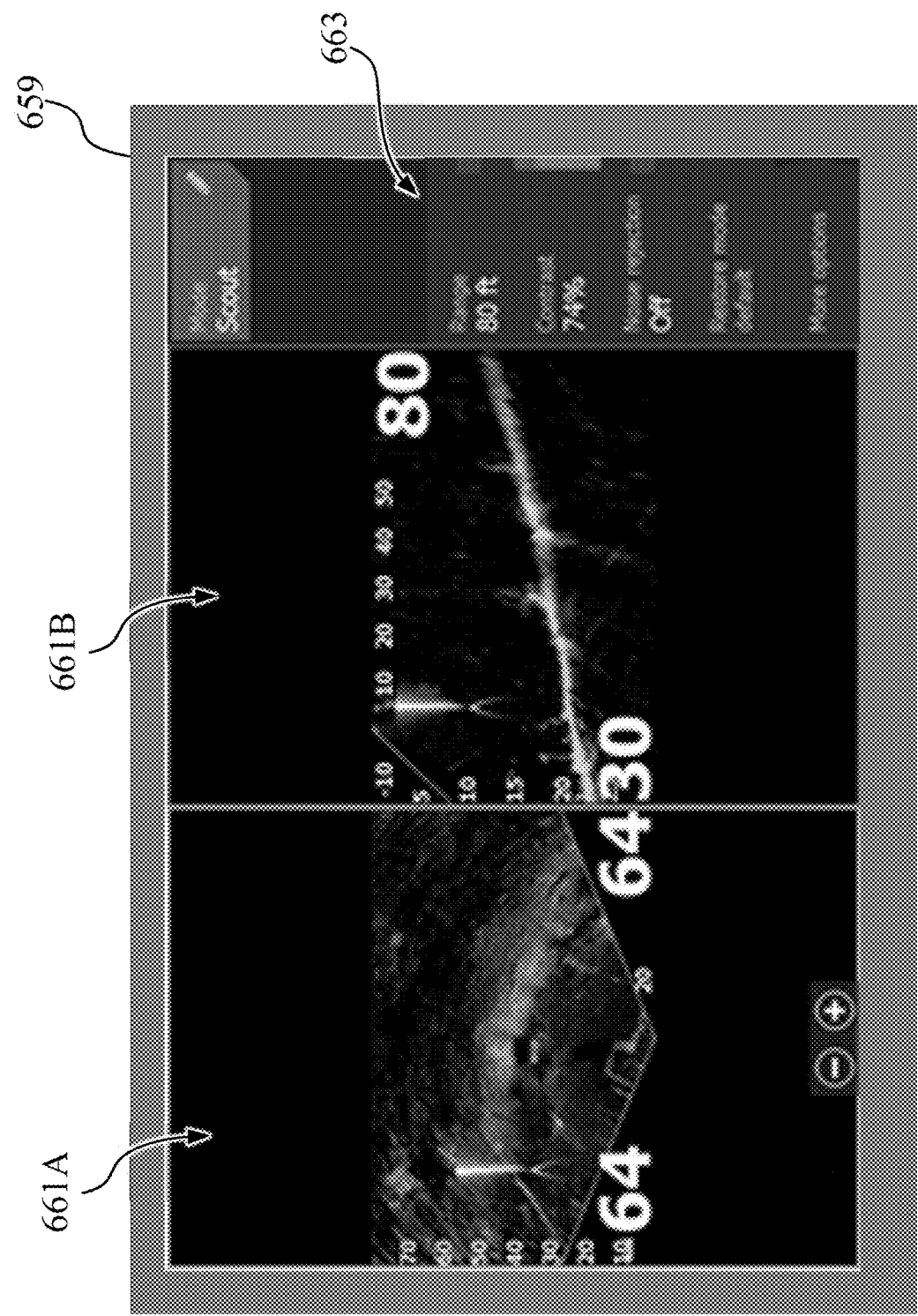
Figure 7:
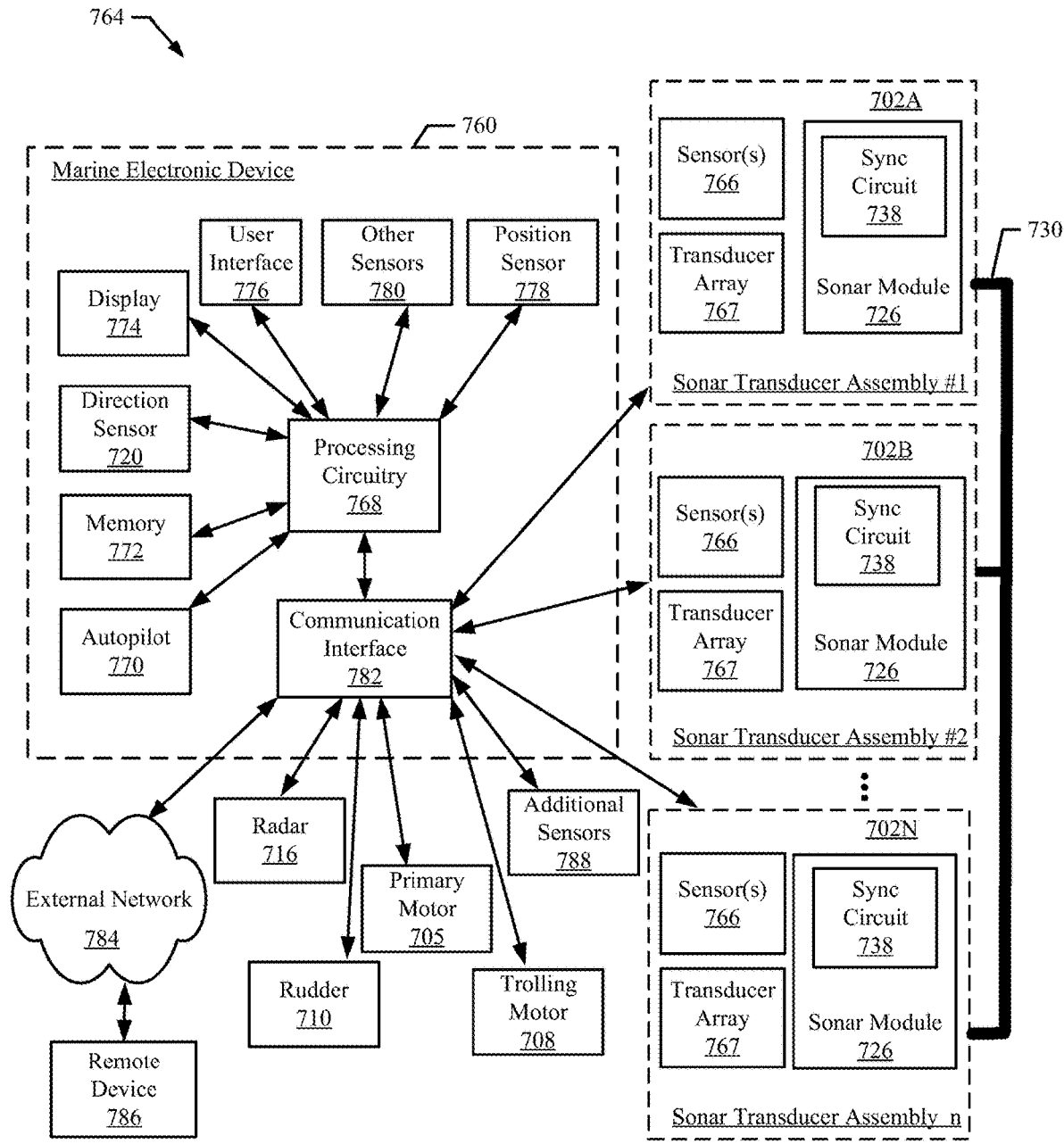
Figure 8:
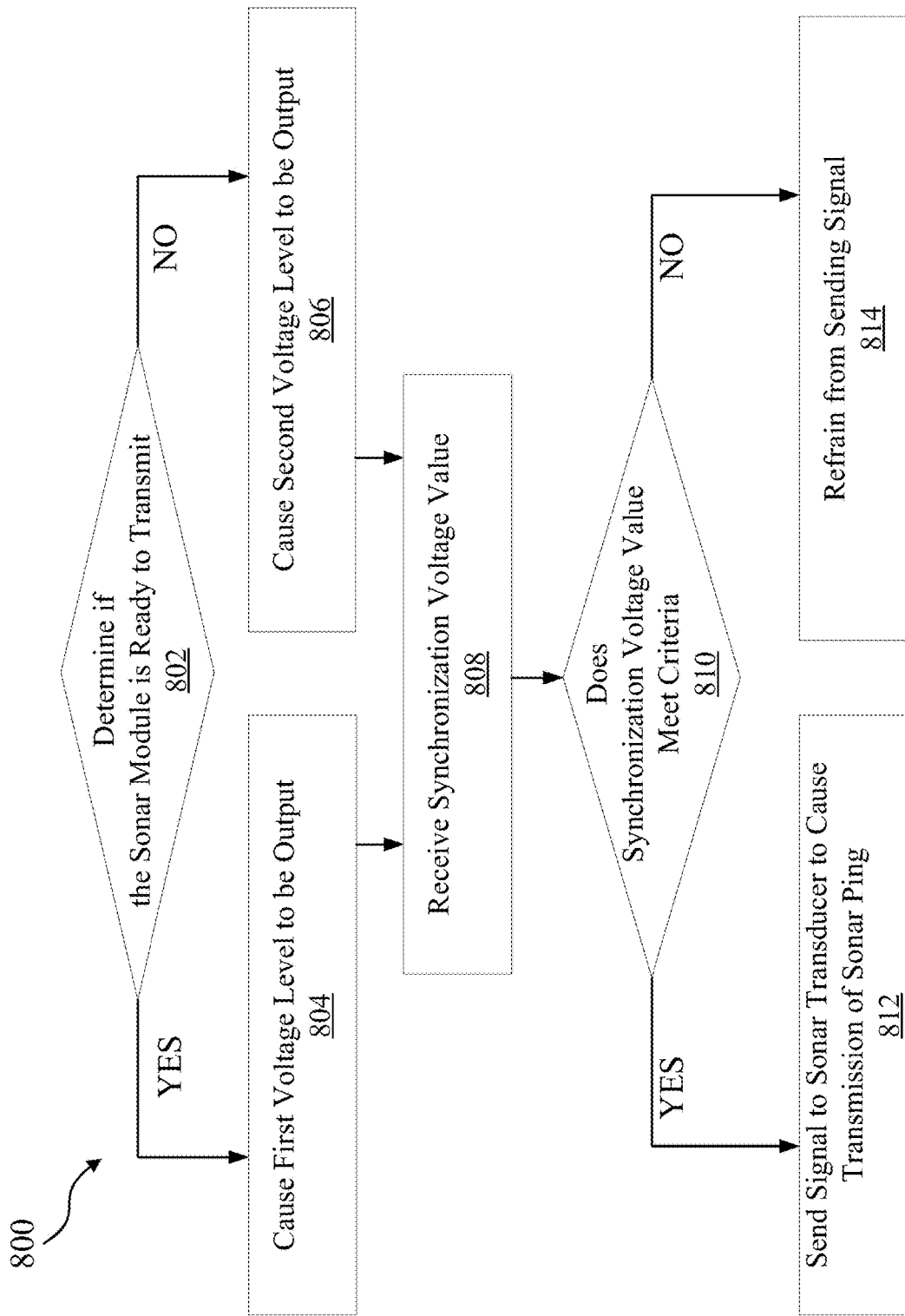

Having thus described the invention in general terms, reference will now be made to the accompanying drawings, which are not necessarily drawn to scale, and wherein:

FIG. 1 illustrates an example watercraft including various marine devices, in accordance with some embodiments discussed herein;

FIG. 2A is a schematic view illustrating sonar assemblies connected together via a synchronization wire, in accordance with some embodiments discussed herein;

FIG. 2B is a schematic view illustrating the sonar assemblies of FIG. 2A where the sonar modules are not ready to transmit a sonar ping, in accordance with some embodiments discussed herein;

FIG. 2C is a schematic view illustrating the sonar assemblies of FIG. 2A where only some of the sonar modules are ready to transmit a sonar ping, in accordance with some embodiments discussed herein;

FIG. 2D is a schematic view illustrating the sonar assemblies of FIG. 2A where the sonar modules are each ready to transmit a sonar ping, in accordance with some embodiments discussed herein;

FIG. 3A-3B are graphical representations illustrating transmission of sonar pings in sonar modules, in accordance with some embodiments discussed herein;

FIGS. 4A-4B are schematic views illustrating components within a sonar module, in accordance with some embodiments discussed herein;

FIG. 5A is a schematic view illustrating an array of sonar transducer elements being used to effectively increase the beam angle corresponding to sonar coverage, in accordance with some embodiments discussed herein;

FIG. 5B is a schematic view illustrating sonar transducer elements emitting sonar pings with overlapping sonar coverage, in accordance with some embodiments discussed herein;

FIG. 5C is a schematic view illustrating three sonar transducer arrays emitting sonar pings in a manner that effectively increases the beam angle and provides continuous sonar coverage, in accordance with some embodiments discussed herein;

FIG. 5D is a schematic view illustrating a transducer array that may use frequency steering to provide sonar beams for a range of angles, in accordance with some embodiments discussed herein;

FIG. 6A is a schematic view illustrating a display with a dual scout mode images presented, in accordance with some embodiments discussed herein;

FIG. 6B is a schematic view illustrating a display having a forward mode image presented, in accordance with some embodiments discussed herein;

FIG. 6C is a schematic view illustrating a display having a scout mode image presented in one area and a forward mode image presented in another area, in accordance with some embodiments discussed herein;

FIG. 7 is a block diagram illustrating components of an example system, in accordance with some embodiments discussed herein; and FIG. 8 is a flowchart illustrating an example method for synchronization of sonar modules, in accordance with some embodiments discussed herein.

DETAILED DESCRIPTION

Example embodiments of the present invention now will be described more fully hereinafter with reference to the accompanying drawings, in which some, but not all embodiments of the invention are shown. Indeed, the invention may be embodied in many different forms and should not be construed as limited to the example embodiments set forth herein; rather, these embodiments are provided so that this disclosure will satisfy applicable legal requirements. Like reference numerals generally refer to like elements throughout (except for the reference numerals used in FIG. 8).

FIG. 1 illustrates an example watercraft 100 including various marine devices, in accordance with some embodiments discussed herein. As depicted in FIG. 1, the watercraft 100 (e.g., a vessel) is configured to traverse a marine environment, e.g. body of water 101, and may use one or more sonar transducer assemblies 102a, 102b, and 102c disposed on and/or proximate to the watercraft 100. Notably, an example watercraft 100 contemplated herein may be surface watercraft, submersible watercraft, or any other implementation known to those skilled in the art. The transducer assemblies 102a, 102b, and 102c may each include one or more transducer elements (such as in the form of the example assemblies described herein) configured to transmit sound waves into a body of water 101, receive sonar returns from the body of water 101, and convert the sonar returns into sonar return data. Various types of sonar transducers may be provided—for example, a linear downscan sonar transducer, a conical downscan sonar transducer, a sonar transducer array, or a sidescan sonar transducer may be used.

Depending on the configuration, the watercraft 100 may include a primary motor 105, which may be a main propulsion motor such as an outboard or inboard motor. Additionally, the watercraft 100 may include a trolling motor 108 configured to propel the watercraft 100 or maintain a position. The one or more transducer assemblies (e.g., 102a, 102b, and/or 102c) may be mounted in various positions and to various portions of the watercraft 100 and/or equipment associated with the watercraft 100. For example, the transducer assembly may be mounted proximate to the transom 106 of the watercraft 100, such as depicted by transducer assembly 102a. The transducer assembly may be mounted to the bottom or side of the hull 104 of the watercraft 100, such as depicted by transducer assembly 102b. The transducer assembly may be mounted to the trolling motor 108, such as depicted by transducer assembly 102c.

The watercraft 100 may also include one or more marine electronic devices 160, such as may be utilized by a user to interact with, view, or otherwise control various aspects of the various sonar systems described herein. In the illustrated embodiment, the marine electronic device 160 is positioned proximate the helm (e.g., steering wheel) of the watercraft 100—although other places on the watercraft 100 are contemplated. Likewise, additionally or alternatively, a remote device (such as a user's mobile device) may include functionality of a marine electronic device.

The watercraft 100 may also comprise other components within the one or more marine electronic devices 160 or at the helm. In FIG. 1, the watercraft 100 comprises a radar 116, which is mounted at an elevated position (although other positions relative to the watercraft 100 are also contemplated). The watercraft 100 also comprises an AIS transceiver 118, a direction sensor 120, and a camera 122, and these components are each positioned at or near the helm (although other positions relative to the watercraft 100 are also contemplated). Additionally, the watercraft 100 comprises a rudder 110 at the stern of the watercraft 100, and the rudder 110 may be positioned on the watercraft 100 so that the rudder 110 will rest in the body of water 101. In other embodiments, these components may be integrated into the one or more electronic devices 160 or other devices. Another example device on the watercraft 100 includes a temperature sensor 112 that may be positioned so that it will rest within or outside of the body of water 101. Other example devices include a wind sensor, one or more speakers, and various vessel devices/features (e.g., doors, bilge pump, fuel tank, etc.), among other things. Additionally, one or more sensors may be associated with marine devices; for example, a sensor may be provided to detect the position of the primary motor 105, the trolling motor 108, or the rudder 110.

In various embodiments described herein, a plurality of sonar modules may be synchronized so that sonar pings are transmitted at the same time. FIG. 2A illustrates a schematic view of sonar assemblies 224A, 224B, 224N (collectively referred to herein as 224) connected together via a synchronization wire 230. The sonar assemblies 224 may each include a sonar module and a sonar transducer. For example, the first sonar assembly 224A may include a first sonar module 226A and a first sonar transducer 228A, and the second sonar assembly 224B may include a second sonar module 226B and a second sonar transducer 228B. Any number of sonar assemblies may be provided, and this is indicated by the final sonar assembly 224N, which may include a final sonar module 226N and a final sonar transducer 228N. In some embodiments, the synchronization wire 230 may be connected directly to the sonar module in each sonar assembly 224. The sonar transducers 228A, 228B, 228N (collectively referred to herein as 228) may each be configured to transmit sonar pings, and the sonar modules 226A, 226B, 226N (collectively referred to herein as 226) may be configured to control the timing of transmissions at the sonar transducers 228. Notably, each of the sonar transducer(s) 1, 2, n may be one or more sonar transducer elements, one or more arrays, or other configurations of sonar transducer(s).

Electrical current having a certain voltage level may be provided by the sonar modules 226 to the synchronization wire 230, with voltage provided as digital logic voltages in some embodiments. In some embodiments, each sonar module 226 may provide a first digital logic voltage level when the sonar module 226 is not ready to transmit, and each sonar module 226 may provide a second digital logic voltage level when the sonar module 226 is ready to transmit. The first digital logic voltage level may be zero volts in some embodiments, but other values may be used as well. Likewise, the second digital logic voltage level may be 1 volt in some embodiments, but other values may be used as well. Notably, an importance is a noticeable difference between the two digital logic voltage levels. In some embodiments, a relatively lower digital logic voltage level may be used to indicate when the sonar module 22 is not ready to transmit and a relatively higher digital logic voltage level may be used to indicate when the sonar module 22 is ready to transmit.

The sonar modules 226 may be configured to detect the voltage level at the synchronization wire 230. For example, the signal from the synchronization wire 230 may be received at processing circuitry 432 (see FIG. 4A) within each sonar module 226. Based on the received signals, the processing circuitry 432 may determine if all of the sonar modules 226 are ready to transmit (e.g. if a predetermined digital logic voltage is received from synchronization wire 230). If the processing circuitry 432 determines that the voltage level received from the synchronization wire 230 meets certain criteria, then the processing circuitry 432 in each sonar module 226 may cause the sonar modules 226 to cause a transmission of a sonar ping to occur. The processing circuitry 432 may cause the sonar modules 226 to send a transmit signal to their associated sonar transducers 228 in some embodiments, and this transmit signal may cause the sonar transducers 228 to generate a sonar ping.

The processing circuitry 432 and/or the sonar modules 226 may cause transmission of sonar pings in other ways. In some embodiments, the criteria used to determine whether or not to cause transmission of sonar pings may be whether or not the voltage level at the synchronization wire exceeds a certain value, whether or not the voltage level at the synchronization wire is equal to a specified value, etc. If the processing circuitry 432 determines that the voltage level received from the synchronization wire 230 does not meet the requisite criteria, then the processing circuitry 432 may cause a respective sonar module 226 to refrain from causing transmission of a sonar ping. Because the voltage will be the same for each processing circuitry, synchronization may be accomplished.

The synchronization wire 230 may be provided in a four-wire power connector in some embodiments, with the synchronization wire 230 being an existing blue wire on the four-wire power connector. A voltage level for electrical current flowing at the blue wire may be sufficiently high in some instances to permit appropriate signal propagation between units, which may be several feet apart in some embodiments.

Ping synchronization may synchronize two or more independent sonar modules so that the sonar modules cause the transmission of sonar pings at the same time. Examples of this are illustrated in FIGS. 2B-2D. As illustrated in FIG. 2B, a first sonar assembly 224A, a second sonar assembly 224B, and a final sonar assembly 224N are provided. An electrical current may be provided at the synchronization wire 230 having a voltage level that may be detected by computer program code running on processing circuitry 432 (see FIG. 4A) in a sonar module 226. By using this computer program code, each sonar module may halt until all other sonar modules are also ready to transmit, and each sonar module may cause sonar pings to be transmitted at the same time once each of the sonar modules 226 are ready to transmit.

Looking first at the example in FIG. 2B, the first sonar module 226A, the second sonar module 226B, and the final sonar module 226N are not ready to transmit. Based on these sync states for the sonar modules 226, the sync state at the synchronization wire 230 may similarly indicate that the system is not ready to transmit sonar pings. The sync state may be provided at the synchronization wire 230 based on the voltage level of electrical current at the synchronization wire. Thus, the sonar modules 226 may each detect the sync state at the synchronization wire 230 and refrain from causing a sonar ping to be generated.

In the example of FIG. 2C, the first sonar module 226A and the second sonar module 226B are ready to transmit, but the final sonar module 226N is not ready to transmit. Based on these sync states for the sonar modules 226, the sync state at the synchronization wire 230 may indicate that the system is not ready to transmit sonar pings. Thus, the sonar modules 226 may each detect the sync state at the synchronization wire 230 and refrain from causing a sonar ping to be generated at a respective sonar transducer.

Looking now at the example in FIG. 2D, the first sonar module 226A, the second sonar module 226B, and the final sonar module 226N (and any other connected sonar module) are each ready to transmit. Based on these sync states for the sonar modules 226, the sync state at the synchronization wire 230 may similarly indicate that the system is ready to transmit sonar pings. Thus, the sonar modules 226 may each detect the sync state at the synchronization wire 230 and cause a sonar ping to be generated at respective sonar transducer(s).

While FIGS. 2A-2D provide schematic views illustrating synchronization of sonar modules, FIGS. 3A-3B provide graphical representations that further illustrate this synchronization. Looking first at FIG. 3A, the top plot illustrates the sync states for sonar modules as a function of time, and the bottom plot shows voltage levels of transmit signals generated as a function of time. At an initial time A, the sonar modules (see FIG. 2A, 226A, 226B, 226N) are not ready to transmit. Thus, at time A, the sonar modules may be in a state similar to the one illustrated in FIG. 2B. With the sonar modules in this state, the system may refrain from causing any transmit signals to be sent to corresponding sonar transducer(s).

At time B, at least one of the sonar modules is ready to transmit, but at least one other sonar module is not ready to transmit. Thus, at time B, the sonar modules may be in a state similar to the one illustrated in FIG. 2C. With the sonar modules in this state, the system may again refrain from causing any transmit signals to be sent to corresponding sonar transducer(s).

At time C, each of the sonar modules are ready to transmit. Thus, at time C, the sonar modules may be in a state similar to the one illustrated in FIG. 2D. With the sonar modules in this state, the system may cause a transmit signal to be generated and sent to corresponding sonar transducer(s). At time D, the sync states for each of the sonar modules may be reset so that each of the sonar modules are not ready to transmit. Thus, the sync cycle may begin again.

The transmit signal may occur at various times once the sonar modules are ready to transmit, and FIGS. 3A-3B illustrate examples of this. For example, in some embodiments, the sonar ping may be caused almost immediately after the "ready to transmit" sync state has been detected, and an example of this is illustrated in FIG. 3A. However, in some embodiments, the sonar ping may occur at a certain time after the "ready to transmit" sync state has been detected, and an example of this is illustrated in FIG. 3B.

Various components in sonar modules work together with the synchronization wire to enable synchronization of sonar pings. FIGS. 4A-4B are schematic views illustrating components within a sonar module 426. A connection point on the synchronization wire 430 may be connected to the sonar module 426. In some instances, the sonar module 426 may supply an electrical current to the synchronization wire 430 and/or receive an electrical current from the synchronization wire 430. The sonar module 426 may also include processing circuitry 432, and a control pin 434 and a sense pin 436 may be provided alongside the processing circuitry 432. Software and the processing circuitry 432 may be provided with general-purpose input/output (GPIO) capability. Additionally, a sync circuit 438 may be provided in the sonar module 426. The sync circuit 438 may include a voltage source 440 as well as a pull-up resistor 442. The sync circuit 438 may generally operate with an open-drain topology, and the pull-up resistor 442 may be included to provide a positive voltage level in certain instances. Where multiple sonar modules 426 are provided, the internal components within each sonar module 426 may be identical in some embodiments.

The processing circuitry 432 may effectively communicate the sync state of the sonar module 426 through the use of the control pin 434. This may be done by closing or opening an electrical circuit between the processing circuitry 432 and the sync circuit 438 using the control pin 434 as illustrated in FIGS. 4A-4B.

As illustrated in FIG. 4B, when the sonar module 426 is ready to transmit a sonar ping, the control pin 434 may be shifted to contact a portion of the sync circuit 438 to close an electrical circuit with the sync circuit 438. By doing so, a first voltage level may be output to the synchronization wire 430. This first voltage level may be a non-zero voltage in some embodiments, and a corresponding second voltage level occurring when the electrical circuit is open (see FIG. 4A) may generate a second voltage level of zero volts.

As illustrated in FIG. 4A, when the sonar module 426 is not ready to transmit a sonar ping, the control pin 434 may be shifted so that it will avoid contact with the sync circuit 438 so that no electrical circuit is formed between the processing circuitry 432 and the sync circuit 438. By doing so, a second voltage level may be output to the synchronization wire. Causing the control pin 434 to avoid contact with the sync circuit 438 may cause electrical current from the voltage source 440 to flow to ground in some embodiments. The second voltage level output to the synchronization wire 430 may be lower than the first voltage level, and the second voltage level may be zero volts in some embodiments.

Furthermore, a sense pin 436 may be provided at the processing circuitry 432. The sense pin 436 may be configured to transfer electrical current between the synchronization wire 430 and the processing circuitry 432. Thus, the processing circuitry 432 may be able to determine the voltage level at the synchronization wire 430.

FIG. 5A is a schematic view illustrating a sonar transducer array 544 being used to effectively increase the beam angle. In FIG. 5A, the sonar transducer array 544 may include a first sonar transducer element that has a first coverage volume 546A having a first beam angle θ1. The sonar transducer array 544 may include a second sonar transducer element that has a second coverage volume 546B having a second beam angle θ2. Additionally, the sonar transducer array 544 may include a third sonar transducer element that has a third coverage volume 546C having a third beam angle θ3. The sonar transducer elements within the sonar transducer array 544 may provide continuous coverage within the coverage volumes 546A, 546B, 546C to provide an effective beam angle θT. This effective beam angle θT is greater than each of the first beam angle θ1, the second beam angle θ2, and the third beam angle θ3. The synchronization systems, methods, etc. described herein may ensure that the sonar data generated by such a sonar transducer array 544 is accurate and reliable.

FIG. 5B is a schematic view illustrating sonar transducer elements emitting sonar pings with overlapping coverage volumes to provide improved image quality. A first sonar transducer element 544A and a second sonar transducer element 544B may be provided. The first sonar transducer element 544A may have a first coverage volume 546A', and the second sonar transducer element 544B may have a second coverage volume 546B'. As illustrated in FIG. 5B, an overlapping volume 548 may be formed where the first coverage volume 546A' and second coverage volume 546B' overlap. By positioning and/or orienting the sonar transducer elements so that their respective coverage volumes overlap, sonar images may be generated with improved image quality and accuracy. Image quality may be improved by obtaining data from sonar pings at different angles, by providing a higher resolution, etc.

FIG. 5C is a schematic view illustrating an example three array sonar assembly that is designed to provide continuous sonar coverage utilizing beamformed sonar return beams. A first transducer array 552A, a second transducer array 552B, and a third transducer array 552C may be provided with a theoretical center point 554. Each sonar transducer array may generate two different ranges of angles with a gap in between the two ranges. The first sonar transducer array 552A may be oriented so that it extends horizontally. Further, the second sonar transducer array 552B may be oriented at a 22.5 degree angle relative to the first sonar transducer array 552A, and the third sonar transducer array 552C may be oriented at a 45 degree angle relative to the first sonar transducer array 552A. Sonar transducer arrays may be oriented differently in other embodiments.

The first transducer array 552A is oriented with a facing direction (e.g., substantially straight down relative to the figure) so as to produce a first range of angles 556A and a second range of angles 556A' (with a gap in between as discussed below with reference to FIG. 5D). The second transducer array 552B is oriented with a facing direction at an angle (e.g., −22.5° relative to the facing direction of the first transducer array 552A) so as to produce a first range of angles 556B and a second range of angles 556B' (with a gap in between). The third transducer array 552C is oriented with a facing direction at another angle (e.g., −45° relative to the facing direction of the first transducer array 552A) so as to produce a first range of angles 556C and a second range of angles 556C' (with a gap in between). As so arranged, the gaps between each set of the two range of angles are covered by a range of angles from each of the other two transducer arrays. The illustrated example thus provides continuous sonar beam coverage for ~135°, although other overall coverage angles are contemplated such as angles ranging from 90°-140°.

Looking now at FIG. 5D, further details regarding a transducer array 552 are illustrated. In some embodiments, each of the plurality of sonar transducer elements are configured to operate at a fixed phase shift (e.g., at one of 0°, π/2 radian, π/4 radian, or π/8 radian) and vary in frequency (e.g., between 500 kHz-1200 kHz). This processing approach beamforms multiple sonar return beams (e.g., beam 591) between a first range of angles ($\theta_1$) 590 and between a second range of angles ($\theta_2$) 592. To explain, the sonar returns may be received by the transducer array 552 and filtered into frequency bins based on the frequency of the signal. From that, sonar return beams 591 can be determined that provide sonar returns within a small angle window (e.g., 0.25° to 3°, although greater or lesser angle windows are contemplated). Since the orientation with respect to the watercraft 100 can be known, and the frequency is known, then the relative angle with respect to the waterline (or other reference) can be determined and used to form sonar imagery, as described for example in U.S. Non-Provisional application Ser. No. 16/944,186, entitled "Beamforming Sonar System with Improved Sonar Image Functionality, and Associated Methods," filed Jul. 31, 2020, and later published as U.S. Pat. Publ. No. 2022/0035026, the teachings of which are hereby incorporated by reference in their entirety.

With further reference to FIG. 5D, the sonar return beams (e.g., 591) can be "steered" (e.g., along arrow R) within the first range of angles 590 based on varying the frequency (e.g., between 590A and 590B). Likewise, the sonar return beams can be "steered" within the second range of angles 592 based on varying the frequency (e.g., between 592A and 592B). By operating the sonar transducer elements at a fixed phase shift, two range of angles 590, 592 can be covered with sonar beams, but there is also a gap (e.g., indicated by the range of angles β) that may not be able to be covered by the frequency steered sonar return beams.

Without being bound by theory, a perhaps simplified explanation of this can be based on considering a single beam shape that is formed by a receipt event of the array. The beam shape is formed of a rather wide main beam lobe, along with at least one relatively small defined side lobe (e.g., the sonar beam 591) that extends outwardly therefrom. By operating at a fixed phase shift and ignoring the main beam lobe, the sonar return signals received within the side lobe can be determined. Further, changing the frequency causes a shifting of the direction of the side lobe among the range of angles (590 or 592). Since the side lobe is symmetrical about the main lobe, there are two ranges of angles that are symmetrical about the facing direction $D_{FD}$ of the emitting face of the transducer array 552.

Further information regarding beamforming, including frequency steered beamforming, can be found, for example, in the following: U.S. Pat. No. RE45,379, entitled "Frequency Division Beamforming for Sonar Arrays"; U.S. Pat. No. 10,114,119, entitled "Sonar Systems and Methods Using Interferometry and/or Beamforming for 3D Imaging"; U.S. Pat. No. 9,739,884, entitled "Systems and Associated Methods for Producing a 3D Sonar Image"; and U.S. patent application Ser. No. 16/382,639, published as U.S. Publication No. 2019/0265354, and entitled "Sonar Transducer Having Geometric Elements"; the contents of each hereby being incorporated by reference in their entireties.

FIG. 6A is a schematic view illustrating a display 659 with a dual-scout mode image 658 presented. The display 659 may be a multifunction display (MFD) in some embodiments. As illustrated, the effective coverage volume in the scout mode image 658 may be relatively large, with an effective beam angle that is approximately 270 degrees. A first transducer array (or a three array sonar assembly similar to the three array sonar assembly 550 of FIG. 5C) may generate a first coverage volume 662A having a beam angle of approximately 135 degrees. Furthermore, a second transducer array (or a three array sonar assembly similar to the three array sonar assembly 550 of FIG. 5C) may generate a second coverage volume 662B having a beam angle of approximately 135 degrees. By providing this increased coverage volume, a user may have an increased awareness of the surrounding underwater environment, and the user may make more well-informed navigational decisions. Further, the increased coverage volume permits users to identify more targets such as fish, landmarks, or other items of interest.

FIG. 6B is a schematic view illustrating a display 659 having a forward mode image 665 presented. In this schematic view, a first section 665A of the forward mode image 665 may be generated by a first sonar assembly and a second section 665B of the forward mode image 665 may be generated by a second sonar assembly. The two sections 665A, 665B may be combined together to form a continuous forward mode image 665. Furthermore, the synchronization of sonar modules may help ensure the accuracy of the forward mode image 665 and may maintain consistency between images produced in the first section 665A and the second section 665B.

Furthermore, in some embodiments, the display 659 may be used to present multiple images simultaneously. For example, FIG. 6C is a schematic view illustrating a display 659 having a scout mode image presented in a first area 661A and a forward mode image presented in a second area 661B. A third area 663 may also be provided with a selection menu and/or or other textual information, numerical information, etc.

FIG. 7 is a block diagram of an example system 764. The illustrated system 764 includes a marine electronic device 760 (e.g., a device mounted to watercraft, a device connected to a watercraft network, any device usable in the marine environment (such as a smartphone, tablet, laptop, etc.), among others). The system 764 may comprise numerous marine devices. As shown in FIG. 7, one or more transducer assemblies 702A, 702B, 702N may be provided. A radar 716, a primary motor 705, a trolling motor 708, a rudder 710, and additional sensors/devices 788 may also be provided as marine devices, but other marine devices may be provided as well. One or more marine devices may be implemented on the marine electronic device 760. For example, a position sensor 778, a direction sensor 720, an autopilot 770, and other sensors 780 may be provided within the marine electronic device 760. These marine devices can be integrated within the marine electronic device 760, integrated on a watercraft at another location and connected to the marine electronic device 760, and/or the marine devices may be implemented at a remote device 786 in some embodiments. The system 764 may include any number of different systems, modules, or components, and each of these may comprise any device or means embodied in either hardware, software, or a combination of hardware and software configured to perform one or more corresponding functions described herein.

The marine electronic device 760 may include processing circuitry 768, a memory 772, a communication interface 782, a user interface 776, a display 774, autopilot 770, and one or more sensors (e.g. position sensor 778, direction sensor 720, other sensors 780). One or more of the components of the marine electronic device 760 may be located within a housing, or they may be separated into different housings (e.g., be remotely located).

The processing circuitry 768 may be any means configured to execute various programmed operations or instructions stored in a memory device (e.g., memory 772) such as a device or circuitry operating in accordance with software or otherwise embodied in hardware or a combination of hardware and software (e.g. a processor operating under software control or the processor embodied as an application specific integrated circuit (ASIC) or field programmable gate array (FPGA) specifically configured to perform the operations described herein, or a combination thereof) thereby configuring the device or circuitry to perform the corresponding functions of the processing circuitry 768 as described herein. For example, the processing circuitry 768 may be configured to analyze sonar return data for various features/functions described herein (e.g., generate a sonar image, determine an object and/or object position, etc.). One or more microprocessors, controllers, microcontrollers, servers, computers, etc. may serve as processing circuitry in some embodiments.

In some embodiments, the processing circuitry 768 may be further configured to implement signal processing. In some embodiments, the processing circuitry 768 may be configured to perform enhancement features to improve the display characteristics of data or images, collect or process additional data. The processing circuitry 768 may further implement notices and alarms, such as those determined or adjusted by a user.

In some embodiments, the memory 772 may include one or more non-transitory storage or memory devices such as, for example, volatile and/or non-volatile memory that may be either fixed or removable. The memory 772 may be configured to store instructions, computer program code, sonar data, and additional data such as radar data, chart data, location/position data in a non-transitory computer readable medium for use, such as by the processing circuitry 768 for enabling the marine electronic device 760 to carry out various functions in accordance with example embodiments of the present invention. For example, the memory 772 could be configured to buffer input data for processing by the processing circuitry 768. Additionally or alternatively, the memory 772 could be configured to store instructions for execution by the processing circuitry 768.

In some embodiments, computer program code may be provided, and this may be provided in memory 772 in some embodiments. Computer program code may be configured to cause the processing circuitry 768 to take certain actions. For example, the computer program code may cause the processing circuitry 768 to perform the method 800 illustrated in FIG. 8. However, the computer program code may be configured to cause the processing circuitry 768 to perform other functions.

The communication interface 782 may be configured to enable communication to external systems (e.g. via an external network 784). In this manner, the marine electronic device 760 may retrieve stored data from a remote device 786 via the external network 784 in addition to or as an alternative to the onboard memory 772. Additionally or alternatively, the marine electronic device 760 may transmit or receive data, such as sonar signal data, sonar return data, sonar image data, or the like to or from transducer assemblies 702A, 702B, 702N. In some embodiments, the marine electronic device 760 may also be configured to communicate with other devices or systems (such as through the external network 784 or through other communication networks, such as described herein). For example, the marine electronic device 760 may communicate with a propulsion system of the watercraft 100 (e.g., for autopilot control); a remote device (e.g., a user's mobile device, a handheld remote, etc.); or another system. Using the external network 784, the marine electronic device may communicate with and send and receive data with external sources such as a cloud, server, etc. The marine electronic device 760 may send and receive various types of data. For example, the marine electronic device 760 may receive weather data, data from other fish locator applications, alert data, among others. However, this data is not required to be communicated using external network 784, and the data may instead be communicated using other approaches, such as through a physical or wireless connection via the communications interface 782.

The communications interface 782 of the marine electronic device 760 may also include one or more communications modules configured to communicate with one another in any of a number of different manners including, for example, via a network. In this regard, the communications interface 782 may include any of a number of different communication backbones or frameworks including, for example, Ethernet, the NMEA 2000 framework, GPS, cellular, Wi-Fi, or other suitable networks. The network may also support other data sources, including GPS, autopilot 770, engine data, compass, radar, etc. In this regard, numerous other peripheral devices (including other marine electronic devices or sonar transducer assemblies) may be included in the system 764.

The position sensor 778 may be configured to determine the current position and/or location of the marine electronic device 760 (and/or the watercraft 100). For example, the position sensor 778 may comprise a GPS, bottom contour, inertial navigation system, such as machined electromagnetic sensor (MEMS), a ring laser gyroscope, or other location detection system. Alternatively or in addition to determining the location of the marine electronic device 760 or the watercraft 100, the position sensor 778 may also be configured to determine the position and/or orientation of an object outside of the watercraft 100.

The display 774 (e.g. one or more screens) may be configured to present images and may include or otherwise be in communication with a user interface 776 configured to receive input from a user. The display 774 may be, for example, a conventional LCD (liquid crystal display), a touch screen display, mobile device, or any other suitable display known in the art upon which images may be displayed.

In some embodiments, the display 774 may present one or more sets of data (or images generated from the one or more sets of data). Such data includes, for example, chart data, radar data, sonar data, weather data, location data, position data, orientation data, sonar data, or any other type of information relevant to the watercraft 100. Sonar data may be received from one or more transducer arrays 767 or from sonar devices positioned at other locations, such as remote from the watercraft. Additional data may be received from marine devices such as a radar 716, a primary motor 705 or an associated sensor, a trolling motor 708 or an associated sensor, rudder 710, an autopilot 770, a position sensor 778, a direction sensor 720, other sensors 780, a remote device 786, onboard memory 772 (e.g., stored chart data, historical data, etc.), or other devices.

In some further embodiments, various sets of data, referred to above, may be superimposed or overlaid onto one another and presented on the display 774. For example, a route may be applied to (or overlaid onto) a chart (e.g. a map or navigational chart). Additionally or alternatively, depth information, weather information, radar information, sonar information, or any other navigation system inputs may be applied to one another.

The user interface 776 may include, for example, a keyboard, keypad, function keys, mouse, scrolling device, input/output ports, touch screen, or any other mechanism by which a user may interface with the system.

Although the display 774 of FIG. 7 is shown as being directly connected to the processing circuitry 768 and within the marine electronic device 760, the display 774 alternatively be remote from the processing circuitry 768 and/or marine electronic device 760. Likewise, in some embodiments, the position sensor 778 and/or user interface 776 may be remote from the marine electronic device 760.

The marine electronic device 760 may include one or more other sensors/devices 780, such as configured to measure or sense various other conditions. The other sensors/devices 780 may include, for example, an air temperature sensor, a water temperature sensor, a current sensor, a light sensor, a wind sensor, a speed sensor, or the like.

The transducer assemblies 702A, 702B, 702N illustrated in FIG. 7 may each include one or more sonar transducer array(s) and/or elements 767 (e.g., of any type), such as described herein. In some embodiments, additional separate sonar transducer elements (arranged to operate alone, in an array, or otherwise) may be included. The transducer assemblies 702A, 702B, 702N may also include a sonar signal processor or other processor (although not shown) configured to perform various sonar processing. In some embodiments, the processing circuitry 768 may be configured to filter sonar return data and/or selectively control sonar transducer element(s) 767. For example, various processing devices (e.g., a multiplexer, a spectrum analyzer, A-to-D converter, etc.) may be utilized in controlling or filtering sonar return data and/or transmission of sonar signals from the sonar transducer element(s) 767.

The transducer assemblies 702A, 702B, 702N may include one or more other systems, such as various sensor(s) 766. For example, the transducer assemblies 702A, 702B, 702N may include an orientation sensor, such as gyroscope or other orientation sensor (e.g., accelerometer, MEMS, direction, etc.) that can be configured to determine the relative orientation and/or direction of the transducer assemblies 702A, 702B, 702N and/or the one or more sonar transducer array(s) and/or element(s) 767—such as with respect to the watercraft. In some embodiments, additionally or alternatively, other types of sensor(s) are contemplated, such as, for example, a water temperature sensor, a current sensor, a light sensor, a wind sensor, a speed sensor, or the like. Each transducer assembly may also include a sonar module 726 having a sync circuit 738. Sonar modules 726 of FIG. 7 may also include processing circuitry 432 similar to the sonar module 426 of FIGS. 4A and 4B. The sonar modules 726 of different transducer assemblies may be connected directly or indirectly via a synchronization wire 730. Sonar data may be received from one or more transducer arrays 767 or from sonar devices positioned at other locations, such as remote from the watercraft.

The components presented in FIG. 7 may be rearranged to alter the connections between components. For example, in some embodiments, a marine device outside of the marine electronic device 760, such as the radar 716, may be directly connected to the processing circuitry 768 rather than being connected to the communication interface 782. Additionally, sensors and devices implemented within the marine electronic device 760 may be directly connected to the communications interface 782 in some embodiments rather than being directly connected to the processing circuitry 768.

FIG. 8 is a flowchart illustrating an example method 800 for synchronization of sonar modules. At operation 802, a determination may be made to see if a sonar module is ready to transmit. If the answer is yes and the sonar module is ready to transmit, then the method 800 may proceed to operation 804. If the answer is no and the sonar module is not ready to transmit, then the method 800 may proceed to operation 806. At operation 804, a first voltage level may be output. At operation 806, a second voltage level may be output. The first voltage level and the second voltage level may be output to a synchronization wire in some embodiments. Further, in some embodiments, the first voltage level and the second voltage level may be provided as a digital logic voltage level. Additionally, in some embodiments, the first voltage level may be a high digital logic voltage level while the second voltage level may be a low digital logic voltage level. The low digital logic voltage level may be zero in some embodiments.

After operation 804 or operation 806 has been performed, the method 800 may proceed to operation 808. At operation 808, a synchronization voltage value may be received, and this may be received from a synchronization wire in some embodiments. This synchronization voltage value may be provided as a digital logic voltage level in some embodiments.

At operation 810, a determination may be made to see whether or not the synchronization voltage value meets certain criteria. If the answer is yes and the synchronization voltage value meets the criteria, then the method 800 may proceed to operation 812. If the answer is no and the synchronization voltage value does not meet the criteria, then the method 800 may proceed to operation 814. As noted above, the criteria may be whether the synchronization voltage value exceeds a predefined voltage level. However, other criteria may be used. For example, the criteria may be to see if the synchronization voltage value is equal to the predefined voltage level in some embodiments.

At operation 812, a signal is sent to the sonar transducer to cause transmission of a sonar ping. At operation 814, the method includes refraining from sending any signal to cause transmission of a sonar ping. However, in some embodiments, the method includes sending a signal at operation 814 to cause the sonar transducer to refrain from transmitting a sonar ping.

The method 800 illustrated in FIG. 8 may be performed iteratively. Thus, after operation 812 or operation 814 has been performed, the method 800 may be reinitiated and begin again at operation 802. In some embodiments, the method 800 may be performed by a sonar module within a sonar assembly. However, the method 800 may be performed by other items such as a sonar assembly in other embodiments.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

That which is claimed:

1. A system for synchronizing sonar ping transmissions from multiple sonar transducer elements or arrays, the system comprising:
   a first sonar module that is configured to control a first time of transmission of a first sonar ping from a first sonar transducer, the first sonar module having:
      a first processing circuitry;
      a first memory including a first computer program code;
   a second sonar module that is configured to control a second time of transmission of a second sonar ping from a second sonar transducer, the second sonar module having:
      a second processing circuitry;
      a second memory including a second computer program code; and
   a synchronization wire connecting the first sonar module and the second sonar module,
   wherein the first computer program code is configured to, when executed, cause the first processing circuitry to:
      cause a first voltage level to be output from the first sonar module to the synchronization wire when the first sonar module is ready to transmit the first sonar ping;
      cause a second voltage level to be output from the first sonar module to the synchronization wire when the first sonar module is not ready to transmit the first sonar ping;
      receive a synchronization voltage value from the synchronization wire;
      determine whether the synchronization voltage value meets predefined criteria; and
      send a first signal to the first sonar transducer upon determining that the synchronization voltage value meets the predefined criteria, wherein the first signal is configured to cause transmission of the first sonar ping,
   wherein the second computer program code is configured to, when executed, cause the second processing circuitry to:
      cause a third voltage level to be output from the second sonar module to the synchronization wire when the second sonar module is ready to transmit the second sonar ping;
      cause a fourth voltage level to be output from the second sonar module to the synchronization wire when the second sonar module is not ready to transmit the second sonar ping;
      receive the synchronization voltage value from the synchronization wire;
      determine whether the synchronization voltage value meets the predefined criteria; and
      send a second signal to the second sonar transducer upon determining that the synchronization voltage value meets the predefined criteria, wherein the second signal is configured to cause transmission of the second sonar ping such that the transmission of the second sonar ping occurs at a same time as the transmission of the first sonar ping.

2. The system of claim 1, wherein the first sonar ping and the second sonar ping provide continuous sonar beam coverage of an underwater environment, wherein the first sonar ping has a first beam angle, wherein the second sonar ping has a second beam angle, and wherein the continuous sonar beam coverage has an increased effective beam angle relative to each of the first beam angle and the second beam angle.

3. The system of claim 1, wherein the first sonar ping and the second sonar ping have overlapping coverage volumes to provide improved image quality.

4. The system of claim 1, wherein the first computer program code is configured to, when executed, cause the first processing circuitry to:
   determine whether the synchronization voltage value exceeds a specified value; and
   cause transmission of the first sonar ping at a synchronized time upon determining that the synchronization voltage value exceeds the specified value.

5. The system of claim 1, wherein the first computer program code is configured to, when executed, cause the first processing circuitry to:
   determine whether the synchronization voltage value is equal to a specified value; and
   cause transmission of the first sonar ping at a synchronized time upon determining that the synchronization voltage value is equal to the specified value.

6. The system of claim 1, wherein the first sonar module further comprises:
   a first control pin; and
   a first sync circuit,
   wherein the first computer program code is configured to, when executed, cause the first processing circuitry to:
      cause the first voltage level to be output to the synchronization wire when the first sonar module is ready to transmit the first sonar ping by causing the first control pin to contact a portion of the first sync circuit to close the first sync circuit; and
      cause the second voltage level to be output to the synchronization wire when the second sonar module is not ready to transmit the first sonar ping by causing the first control pin to avoid contact with the first sync circuit so that the first sync circuit remains open.

7. The system of claim 6, wherein the first sonar module further comprises a first sense pin that is configured to transfer electrical current between the synchronization wire and the first processing circuitry.

8. The system of claim 6, wherein the first sync circuit includes a voltage source, wherein causing the first control pin to avoid contact with the first sync circuit causes electrical current to flow to ground.

9. The system of claim 6, wherein the second sonar module further comprises:
a second control pin; and
a second sync circuit,
wherein the second computer program code is configured to, when executed, cause the second processing circuitry to:
cause the third voltage level to be output to the synchronization wire when the second sonar module is ready to transmit the second sonar ping by causing the second control pin to contact a portion of the second sync circuit to close the second sync circuit; and
cause the fourth voltage level to be output to the synchronization wire when the second sonar module is not ready to transmit the second sonar ping by causing the second control pin to avoid contact with the second sync circuit so that the second sync circuit remains open.

10. The system of claim 1, wherein the first sync circuit operates through open drain topology.

11. The system of claim 10, wherein the first sync circuit includes a pull-up resistor.

12. The system of claim 1, wherein the first voltage level is a non-zero voltage, wherein the second voltage level is zero.

13. The system of claim 1, comprising three or more sonar modules, wherein the synchronization wire connects each of the three or more sonar modules.

14. A method for synchronizing sonar ping transmissions from multiple sonar transducer elements or arrays, the method comprising:

determining, at a first sonar module for a first sonar transducer, whether the first sonar module is ready to transmit a first sonar ping;

causing a first voltage level to be output from the first sonar module to a synchronization wire when the first sonar module is ready to transmit a first sonar ping;

causing a second voltage level to be output from the first sonar module to the synchronization wire when the first sonar module is not ready to transmit the first sonar ping, wherein the synchronization wire is configured to receive electrical voltages from a second sonar module;

receiving, at the first sonar module, a synchronization voltage value from the synchronization wire;

determining, at the first sonar module, whether the synchronization voltage value meets predefined criteria; and sending a signal from the first sonar module to the first sonar transducer upon determining that the synchronization voltage value meets the predefined criteria, wherein the second sonar module is configured to cause transmission of a second sonar ping, wherein the signal is configured to cause transmission of the first sonar ping such that the transmission of the first sonar ping occurs at a same time as the transmission of the second sonar ping.

15. The method of claim 14, wherein the first sonar ping and the second sonar ping provide continuous sonar beam coverage of an underwater environment, wherein the first sonar ping has a first beam angle, wherein the second sonar ping has a second beam angle, and wherein the continuous sonar beam coverage has an increased effective beam angle relative to each of the first beam angle and the second beam angle.

16. The method of claim 14, wherein the first sonar ping and the second sonar ping have overlapping coverage volumes to provide improved image quality.

17. The method of claim 14, wherein the signal is configured to cause transmission of the first sonar ping such that the transmission of the first sonar ping occurs simultaneously with transmission of at least two other sonar pings.

* * * * *